(12) United States Patent
Shi et al.

(10) Patent No.: US 8,345,743 B2
(45) Date of Patent: Jan. 1, 2013

(54) SYSTEMS AND METHODS FOR CHANNEL SWITCHING

(75) Inventors: Fang Shi, San Diego, CA (US); Christopher John Bennett, San Diego, CA (US); Serafim S. Loukas, Jr., Carlsbad, CA (US); Brian William Orr, San Diego, CA (US); Vijayalakshmi R. Raveendran, San Diego, CA (US); Scott T. Swazey, San Diego, CA (US); Amnon Silberger, San Diego, CA (US); Thadi M. Nagaraj, San Diego, CA (US); Gordon Kent Walker, Poway, CA (US); David Brackman, San Diego, CA (US); Fang Liu, San Diego, CA (US); Sumeet Singh Sethi, San Diego, CA (US); Ramkumar Sampathkumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1033 days.

(21) Appl. No.: 11/940,122

(22) Filed: Nov. 14, 2007

(65) Prior Publication Data

US 2008/0170564 A1 Jul. 17, 2008

Related U.S. Application Data

(60) Provisional application No. 60/865,822, filed on Nov. 14, 2006.

(51) Int. Cl.
*H04B 1/66* (2006.01)

(52) U.S. Cl. .................................................. 375/240.02

(58) Field of Classification Search .................. None
See application file for complete search history.

(56) References Cited

U.S. PATENT DOCUMENTS

| | | | |
|---|---|---|---|
| 5,241,563 | A | 8/1993 | Paik et al. |
| 5,875,199 | A | 2/1999 | Luthi |
| 6,057,884 | A | 5/2000 | Chen et al. |
| 6,370,666 | B1 | 4/2002 | Lou et al. |
| 6,480,541 | B1 | 11/2002 | Girod et al. |
| 6,535,240 | B2 | 3/2003 | Yang et al. |

(Continued)

FOREIGN PATENT DOCUMENTS

CN 1278138 12/2000

(Continued)

OTHER PUBLICATIONS

Karczewicz M et al.: "The SP- and SI-frame design for H.264/AVC," IEEE Transactions on Circuits and Systems for Video Technology, Jul. 2003, pp. 637-644, vol. 13, No. 7, XP011099256, ISSN: 1051-8215.

(Continued)

*Primary Examiner* — Otis L Thompson, Jr.
(74) *Attorney, Agent, or Firm* — Timothy F. Loomis; Brent A. Boyd

(57) ABSTRACT

Techniques for video encoding and decoding channel switch frames (CSF) to enable acquisition and re/synchronization of the video stream while preserving compression efficiency is provided. Systems and methods to process multimedia data enabling channel switching are presented. The systems generate a CSF with one or more network adaptation layer (NAL) units as a random access point (RAP) frame. Back-to-back frames are transmitted which include the CSF and a non-RAP frame, each having the same frame ID number.

39 Claims, 19 Drawing Sheets

U.S. PATENT DOCUMENTS

| | | | |
|---|---|---|---|
| 6,611,561 B1 | 8/2003 | Hannuksela et al. | |
| 7,020,823 B2 | 3/2006 | Bushmitch et al. | |
| 7,031,348 B1 | 4/2006 | Gazit | |
| 7,075,986 B2 | 7/2006 | Girod et al. | |
| 7,085,324 B2 | 8/2006 | Choi et al. | |
| 7,116,714 B2 | 10/2006 | Hannuksela | |
| 7,369,610 B2 | 5/2008 | Xu et al. | |
| 7,428,639 B2 | 9/2008 | Demos | |
| 7,552,227 B2 | 6/2009 | Wang | |
| 7,606,314 B2 | 10/2009 | Coleman et al. | |
| 2003/0014752 A1 | 1/2003 | Zaslavsky et al. | |
| 2004/0066854 A1 | 4/2004 | Hannuksela | |
| 2004/0179139 A1 | 9/2004 | Choi et al. | |
| 2004/0181811 A1 | 9/2004 | Rakib | |
| 2004/0213473 A1 | 10/2004 | Ohira | |
| 2004/0218816 A1* | 11/2004 | Hannuksela | 382/232 |
| 2004/0228535 A1 | 11/2004 | Honda et al. | |
| 2004/0243913 A1 | 12/2004 | Budge et al. | |
| 2004/0244037 A1 | 12/2004 | Yamaguchi et al. | |
| 2005/0163211 A1 | 7/2005 | Shanableh | |
| 2005/0175091 A1 | 8/2005 | Puri et al. | |
| 2005/0185541 A1* | 8/2005 | Neuman | 369/47.19 |
| 2005/0185795 A1 | 8/2005 | Song et al. | |
| 2005/0200757 A1 | 9/2005 | Pica et al. | |
| 2005/0213668 A1 | 9/2005 | Iwabuchi et al. | |
| 2006/0018379 A1 | 1/2006 | Cooper | |
| 2006/0120378 A1 | 6/2006 | Usuki et al. | |
| 2006/0120448 A1 | 6/2006 | Han et al. | |
| 2006/0146143 A1* | 7/2006 | Xin et al. | 348/218.1 |
| 2006/0146934 A1 | 7/2006 | Caglar et al. | |
| 2006/0239299 A1 | 10/2006 | Scheid et al. | |
| 2007/0071100 A1 | 3/2007 | Shi et al. | |
| 2007/0071105 A1 | 3/2007 | Tian et al. | |
| 2007/0073779 A1 | 3/2007 | Walker et al. | |
| 2007/0076796 A1 | 4/2007 | Shi et al. | |
| 2007/0083578 A1 | 4/2007 | Chen et al. | |
| 2007/0088971 A1 | 4/2007 | Walker et al. | |
| 2007/0101378 A1 | 5/2007 | Jacobs | |
| 2007/0110105 A1 | 5/2007 | Usuki et al. | |
| 2007/0153914 A1* | 7/2007 | Hannuksela et al. | 375/240.26 |
| 2007/0157248 A1 | 7/2007 | Ellis | |
| 2007/0288959 A1 | 12/2007 | Istvan et al. | |
| 2008/0127258 A1 | 5/2008 | Walker et al. | |
| 2008/0196061 A1 | 8/2008 | Boyce | |
| 2009/0222856 A1 | 9/2009 | Kim et al. | |
| 2009/0245393 A1* | 10/2009 | Stein et al. | 375/240.28 |
| 2010/0021143 A1* | 1/2010 | Toma et al. | 386/109 |
| 2010/0153999 A1 | 6/2010 | Yates | |

FOREIGN PATENT DOCUMENTS

| | | |
|---|---|---|
| CN | 1478355 | 2/2004 |
| CN | 1674674 A | 9/2005 |
| CN | 100337480 | 9/2005 |
| CN | 1830164 | 9/2006 |
| EP | 0966162 A1 | 12/1999 |
| EP | 1061737 A1 | 12/2000 |
| EP | 1657835 | 5/2006 |
| EP | 1715680 A1 | 10/2006 |
| EP | 1756580 A1 | 2/2007 |
| EP | 1941738 | 12/2010 |
| JP | 8307786 A | 11/1996 |
| JP | 2004507178 T | 3/2004 |
| JP | 2004350263 A | 12/2004 |
| JP | 2006505024 A | 2/2006 |
| KR | 2004074365 A | 8/2004 |
| KR | 20040074635 | 8/2004 |
| KR | 2006015757 A | 2/2006 |
| KR | 20060113765 | 2/2006 |
| KR | 20060024416 | 3/2006 |
| KR | 20060087966 A | 8/2006 |
| RU | 2201654 | 3/2003 |
| RU | 2328086 C2 | 6/2008 |
| WO | WO9216071 | 9/1992 |
| WO | WO0167777 | 9/2001 |
| WO | WO0215589 A1 | 2/2002 |
| WO | 03073753 | 9/2003 |
| WO | WO03098475 A1 | 11/2003 |
| WO | WO2004114667 A1 | 12/2004 |
| WO | WO2004114668 A1 | 12/2004 |
| WO | 2005043783 | 5/2005 |
| WO | 2005067191 | 7/2005 |
| WO | WO2005076503 | 8/2005 |
| WO | WO2005106875 A1 | 11/2005 |
| WO | WO2005112465 A1 | 11/2005 |
| WO | WO2006104519 | 10/2006 |
| WO | WO2007038726 | 4/2007 |
| WO | WO2007042916 | 4/2007 |

OTHER PUBLICATIONS

Faerber N et al: "Robust H.263 compatible video transmission for mobile access to video servers" Proceeding of the International Conference on Image Processing. ICIP 1997. Oct. 26-29, 1997, vol. 2, pp. 73-76, XP002171169.

International Search Report—PCT/US2007/084727, International Search Authority—European Patent Office—Jul. 30, 2008.

Partial International Search Report—PCT/US2007/084727, International Search Authority—European Patent Office—May 8, 2008.

Written Opinion—PCT/US2007/084727, International Search Authority—European Patent Office—May 8, 2008.

TIA-1099 "Forward Link Only (Flo) Air Interface Specification for Terrestrial Mobile Multimedia Multicast" Technical Standard, Mar. 2007.

Bernd Girod, "The information theoretical significance of spatial and temporal masking in video signals," SPIE vol. 1077, Human vision, visual processing, and digital display, pp. 178-187 (1989).

International Preliminary Report on Patentability, PCT/US2007/084727, International Preliminary Examining Authority, European Patent Office, Feb. 27, 2009.

Jennehag U et al., "Increasing bandwidth utilization in next generation iptv networks," Image Processing, 2004. ICIP '04. 2004 International Conference on Singapore Oct. 24-27, 2004. Piscataway, NJ, USA, IEEE, Oct. 24, 2004, pp. 2075-2078.

Bormans J et al., "Video Coding with H.264/AVC: tools, performance and complexity," IEEE Circuits and Systems Magazine, IEEE Service Center, New York, NY, US, vol. 4, No. 1, Jan. 2004, pp. 7-28.

Huifang Sun et al., "Error Resilience Video Transcoding for Wireless Communications," IEEE Wireless Communications, IEEE Service Center, Piscataway, NJ, US, vol. 12, No. 4, Aug. 2005, pp. 14-21.

Casoulat, R, et al., "On the Usage of Laser Video for mobile broadcast," Video Standards and Drafts, ISO/IEC JTC1/SC29/WG11, MPEG/M12032, Busan, Apr. 29, 2005, pp. 1-7.

Iain Richardson, H.264 and MPEG-4 Video Coding—Next-Generation Standards, Moscow, Tehnosfera, 2005, pp. 186-197, 220-224.

ITU-T H.264, Series H: Audiovisual and Multimedia System Infrastructure of Audiovisual Services, Coding of Moving Video, "Advanced Video Coding for Generic Audiovisual Services," Nov. 2007: 7.3.5.3 Residual Data Syntax; and 9.2 CALVLC parsing process.

Taiwanese Search report—095135825—TIPO—Aug. 19, 2010.

Wiegand T: "H.264/AVC Video Coding Standard", Berlin, Germany, May 2003.

European Search Report—EP09075354—Search Authority—Munich—Oct. 19, 2009.

* cited by examiner

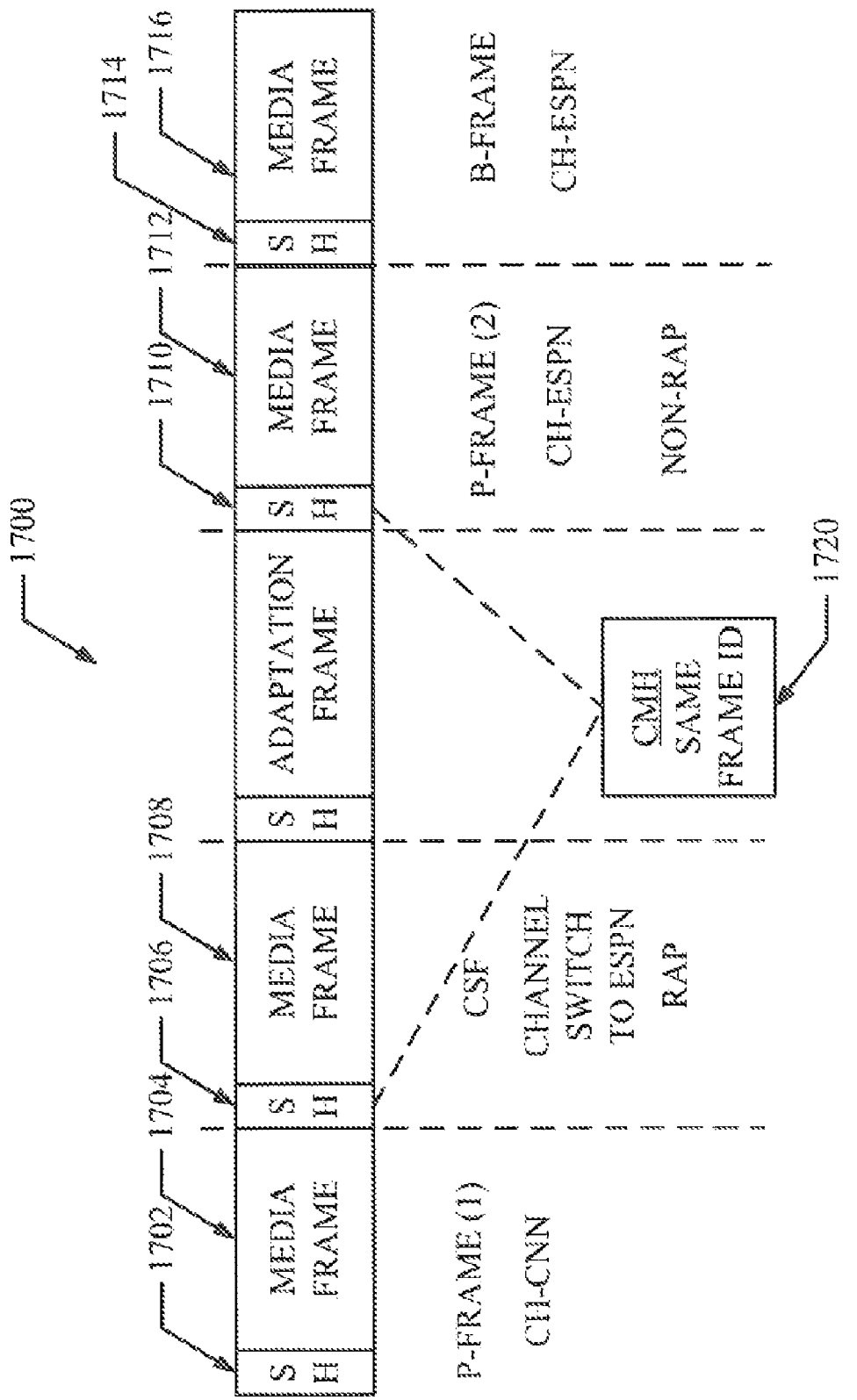

SYSTEMS AND METHODS FOR CHANNEL SWITCHING

CROSS-REFERENCE TO RELATED APPLICATIONS

The present application for patent claims priority benefit of commonly-assigned Provisional Application Ser. No. 60/865,822 entitled "SYSTEMS AND METHODS FOR CHANNEL SWITCHING," filed on Nov. 14, 2006. This provisional patent application is hereby expressly incorporated by reference herein.

This application fully incorporates herein by reference, for all purposes, the commonly-assigned U.S. patent application Ser. Nos. 11/527,306, filed on Sep. 25, 2006, and 11/528,303, filed on Sep. 26, 2006.

BACKGROUND

1. Field

The disclosure is directed to multimedia signal processing and, more particularly, to techniques for video encoding and decoding channel switch frames (CSF) to enable acquisition and re/synchronization of the video stream while preserving compression efficiency.

2. Background

Multimedia processing systems, such as video encoders, may encode multimedia data using encoding methods based on international standards such as Moving Picture Experts Group (MPEG)-1, -2 and -4 standards, the International Telecommunication Union (ITU)-T H.263 standard, and the ITU-T H.264 standard and its counterpart, ISO/IEC MPEG-4, Part 10, i.e., Advanced Video Coding (AVC), each of which is fully incorporated herein by reference for all purposes. Such encoding methods generally are directed to compressing the multimedia data for transmission and/or storage. Compression can be broadly thought of as the process of removing redundancy from the multimedia data.

A video signal may be described in terms of a sequence of pictures, which include frames (an entire picture), or fields (e.g., an interlaced video stream comprises fields of alternating odd or even lines of a picture). As used herein, the term "frame" refers to a picture, a frame or a field. Video encoding methods compress video signals by using lossless or lossy compression algorithms to compress each frame. Intra-frame coding (also referred to herein as intra-coding) refers to encoding a frame using only that frame. Inter-frame coding (also referred to herein as inter-coding) refers to encoding a frame based on other, "reference," frames. For example, video signals often exhibit temporal redundancy in which frames near each other in the temporal sequence of frames have at least portions that are match or at least partially match each other.

Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, which may include 4×4 subblocks, and so forth. As used herein, the term "block" refers to either a macroblock or a subblock.

Encoders take advantage of temporal redundancy between sequential frames using inter-coding motion compensation based algorithms. Motion compensation algorithms identify portions of one or more reference frames that at least partially match a block. The block may be shifted in the frame relative to the matching portion of the reference frame(s). This shift is characterized by one or more motion vector(s). Any differences between the block and partially matching portion of the reference frame(s) may be characterized in terms of one or more residual(s). The encoder may encode a frame as data that comprises one or more of the motion vectors and residuals for a particular partitioning of the frame. A particular partition of blocks for encoding a frame may be selected by approximately minimizing a cost function that, for example, balances encoding size with distortion, or perceived distortion, to the content of the frame resulting from an encoding.

Inter-coding enables more compression efficiency than intra-coding. However, inter-coding can create problems when reference data (e.g., reference frames or reference fields) are lost due to channel errors, and the like. In addition to loss of reference data due to errors, reference data may also be unavailable due to initial acquisition or reacquisition of the video signal at an inter-coded frame. In these cases, decoding of inter-coded data may not be possible or may result in undesired errors and error propagation. These scenarios can result in a loss of synchronization of the video stream.

An independently decodable intra-coded frame is the most common form of frame that enables re/synchronization of the video signal. The MPEG-x and H.26x standards use what is known as a group of pictures (GOP) which comprises an intra-coded frame (also called an I-frame) and temporally predicted P-frames or bi-directionally predicted B frames that reference the I-frame and/or other P and/or B frames within the GOP. Longer GOPs are desirable for the increased compression rates, but shorter GOPs allow for quicker acquisition and re/synchronization. Increasing the number of I-frames will permit quicker acquisition and re/synchronization, but at the expense of lower compression.

There is therefore a need for techniques for video encoding and decoding channel switch frames (CSF) to enable acquisition and re/synchronization of the video stream while preserving compression efficiency.

SUMMARY

Techniques for video encoding and decoding channel switch frames (CSF) to enable acquisition and re/synchronization of the video stream while preserving compression efficiency is provided. In one aspect, a device comprising a processor operative to generate a channel switch frame (CSF) from one or more network abstraction layer (NAL) units to enable random access points in a coded bitstream is provided.

Another aspect includes a computer program product including a computer readable medium having instructions for causing a computer to generate a channel switch frame (CSF) from one or more network abstraction layer (NAL) units to enable random access points in a coded bitstream.

A still further aspect includes a device comprising a processor operative to decode one or more of back-to-back frames, each with the same frame ID number, with a first frame of the back-to-back frames being a random access point (RAP) frame and the second frame being a non-RAP frame.

Additional aspects will become more readily apparent from the detailed description, particularly when taken together with the appended drawings.

BRIEF DESCRIPTION OF THE DRAWINGS

FIG. 17 illustrates an example of a bitstream generated by a network with back-to-back same frame identification numbers.

Figure 1:
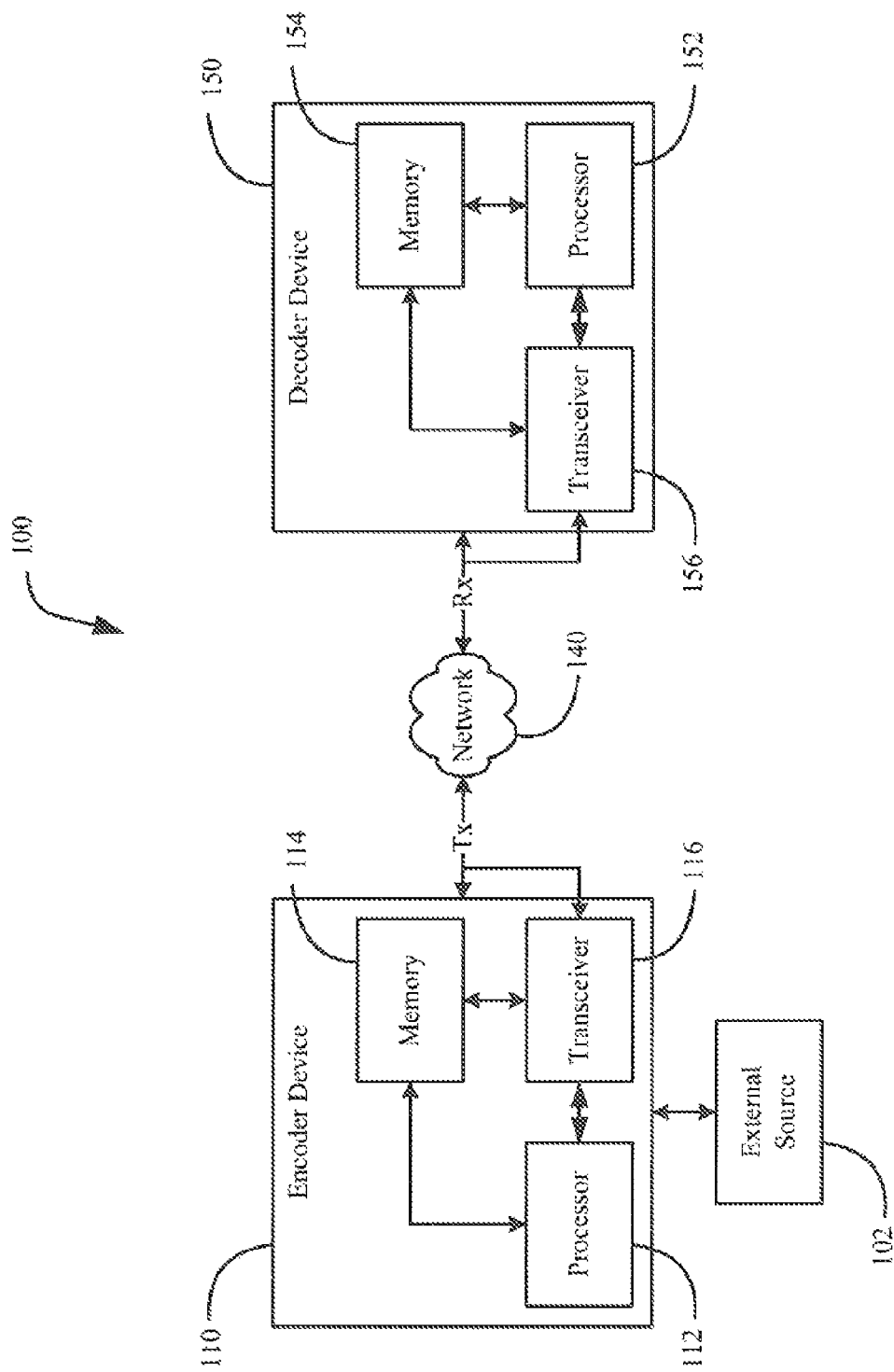
FIG. 1 illustrates a block diagram of an exemplary multimedia communications system according to certain configurations.

The images in the drawings are simplified for illustrative purposes and are not depicted to scale. To facilitate understanding, identical reference numerals have been used, where possible, to designate identical elements that are common to the Figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or blocks of one configuration may be beneficially incorporated in other configurations without further recitation.

DETAILED DESCRIPTION

Abbreviations

The following abbreviations apply to the description provided below:

FLO: Forward Link Only
IDR: Instantaneous Decoding Refresh
IEC: International Electrotechnical Commission
IETF: Internet Engineering Task Force
ISO: International Organization for Standardization
ITU: International Telecommunication Union
ITU-T: ITU Telecommunication Standardization Sector
NAL: Network Abstraction Layer
RBSP: Raw Byte Sequence Payload
TIA: Telecommunications Industry Association
TM3: Terrestrial Mobile Multimedia Multicast
UINT: Unsigned Integer
RAP: Random Access Point
PTS: Presentation Time Stamp The word "exemplary" is used herein to mean "serving as an example, instance, or illustration." Any configuration or design described herein as "exemplary" is not necessarily to be construed as preferred or advantageous over other configurations or designs, and the terms "core", "engine", "machine", "processor" and "processing unit" are used interchangeably.

The techniques described herein may be used for wireless communications, computing, personal electronics, etc. An exemplary use of the techniques for wireless communication is described below.

The following detailed description is directed to certain sample configurations of the invention. However, the invention can be embodied in a multitude of different ways as defined and covered by the claims. In this description, reference is made to the drawings wherein like parts are designated with like numerals throughout.

Video signals may be characterized in terms of a series of pictures, frames, and/or fields, any of which may further include one or more slices. As used herein, the term "frame" is a broad term that may encompass one or more of frames, fields, pictures and/or slices.

Configurations include systems and methods that facilitate channel switching in a multimedia transmission system. Multimedia data may include one or more of motion video, audio, still images, text or any other suitable type of audio-visual data.

FIG. 1 illustrates a block diagram of an exemplary multimedia communications system 100 according to certain configurations. The system 100 includes an encoder device 110 in communication with a decoder device 150 via a network 140. In one example, the encoder device 110 receives a multimedia signal from an external source 102 and encodes that signal for transmission on the network 140.

In this example, the encoder device 110 comprises a processor 112 coupled to a memory 114 and a transceiver 116. The processor 112 encodes data from the multimedia data source and provides it to the transceiver 116 for communication over the network 140.

In this example, the decoder device 150 comprises a processor 152 coupled to a memory 154 and a transceiver 156. While the decoder device 150 may have a transceiver 156 to both transmit and receive, the decoder device 150 only needs a receiver, such as receiver 158. The processor 152 may include one or more of a general purpose processor and/or a digital signal processor. The memory 154 may include one or more of solid state or disk based storage. The transceiver 156 is configured to receive multimedia data over the network 140 and provide it to the processor 152 for decoding. In one example, the transceiver 156 includes a wireless transceiver. The network 140 may comprise one or more of a wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM/GPRS (General packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, a DVB-H system, and the like.

Figure 2A:
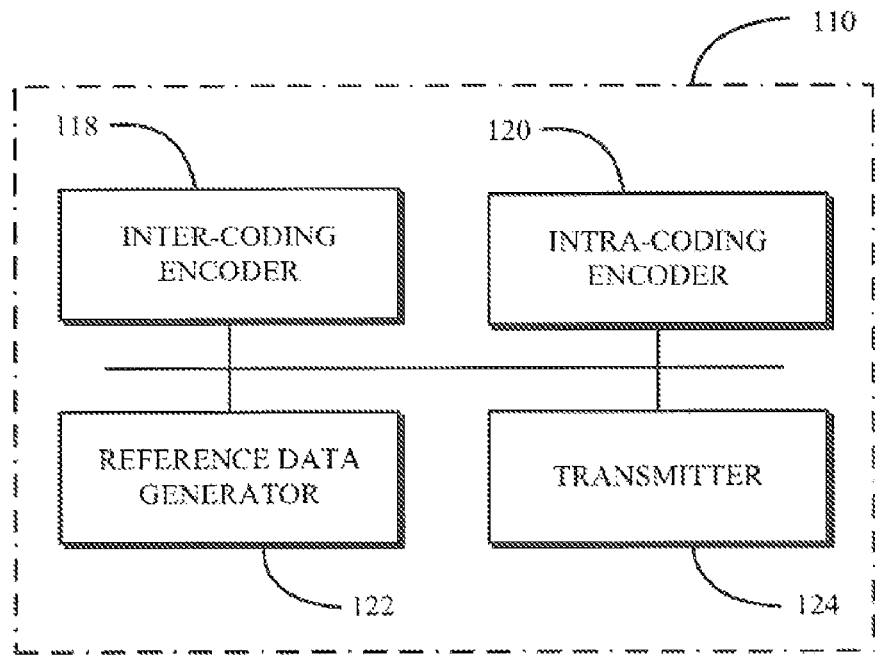
FIG. 2A illustrates a block diagram of an exemplary encoder device that may be used in the system of FIG. 1.

FIG. 2A illustrates a block diagram of an exemplary encoder device 110 that may be used in system 100 of FIG. 1 according to certain configurations. In this configuration, the encoder device 110 comprises an inter-coding encoder element 118, an intra-coding encoder element 120, a reference data generator element 122 and a transmitter element 124. The inter-coding encoder element 118 encodes inter-coded portions of video that are predicted temporally (e.g., using motion compensated prediction) in reference to other portions of video data located in other temporal frames. The intra-coding encoder element 120 encodes intra-coded portions of video that can be decoded independently without reference to other temporally located video data. In some configurations, the intra-coding encoder element 120 may use spatial prediction to take advantage of redundancy in the other video data located in the same temporal frame.

The reference data generator 122, in one aspect, generates data that indicates where the intra-coded and inter-coded video data generated by the encoder elements 120 and 118, respectively, are located. For example, the reference data may include identifiers of subblocks and/or macroblocks that are used by a decoder to locate a position within a frame. The reference data may also include a frame sequence number used to locate a frame within a video frame sequence.

The transmitter 124 transmits the inter-coded data, the intra-coded data, and, in some configurations, the reference data, over a network such as the network 140 of FIG. 1. The data may be transmitted over one or more communication links. The term communication links are used in a general sense and can include any channels of communication including, but not limited to, wired or wireless networks, virtual channels, optical links, and the like. In some configurations the intra-coded data is transmitted on a base layer communication link and the inter-coded data is transmitted over an enhancement layer communication link. In some configurations, the intra-coded data and the inter-coded data are transmitted over the same communication link. In some configurations, one or more of the inter-coded data, the intra-coded data and the reference data may be transmitted over a sideband communication link. For example, a sideband communication link such as the Supplemental Enhancement Information (SEI) messages of H.264 or user_data messages of MPEG-2 may be used. In some configurations, one or more of the intra-coded date, the inter-coded data and the reference data are transmitted over a virtual channel. A virtual channel may comprise data packets containing an identifiable packet header that identifies the data packet as belonging to the virtual channel. Other forms of identifying a virtual channel are known in the art such as frequency division, time division, code spreading, etc.

Figure 2B:
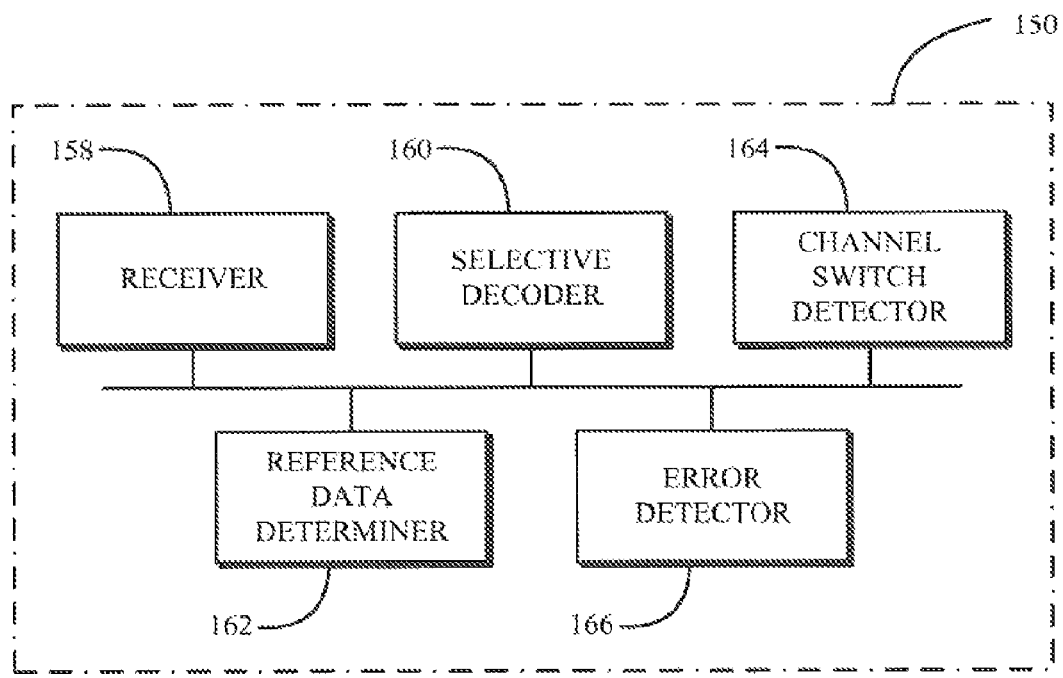
FIG. 2B illustrates a block diagram of an exemplary decoder device that may be used in the system of FIG. 1.

FIG. 2B illustrates a block diagram of an exemplary decoder device 150 that may be used by system 100 of FIG. 1 according to certain configurations. In this configuration, the decoder 150 comprises a receiver element 158, a selective decoder element 160, a reference data determiner element 162, and one or more reference data availability detectors such as a channel switch detector element 164 and an error detector element 166.

The receiver 158 receives encoded video data (e.g., data encoded by the encoder device 110 of FIGS. 1 and 2A). The receiver 158 may receive the encoded data over a wired or wireless network such as the network 140 of FIG. 1. The data may be received over one or more communication links. In some configurations, the intra-coded data is received on a base layer communication link and the inter-coded data is received over an enhancement layer communication link. In some configurations, the intra-coded data and the inter-coded data are received over the same communication link. In some configurations, one or more of the inter-coded data, the intra-coded data and the reference data may be received over a sideband communication link. For example, a sideband communication link such as the Supplemental Enhancement Information (SEI) messages of H.264 or user_data messages of MPEG-2 may be used. In some configurations, one or more of the intra-coded data, the inter-coded data and the reference data are received over a virtual channel. A virtual channel may comprise data packets containing an identifiable packet header that identifies the data packet as belonging to the virtual channel. Other forms of identifying a virtual channel are known in the art.

The selective decoder 160 decodes the received inter-coded and intra-coded video data. In some configurations, the received data comprises an inter-coded version of a portion of video data and an intra-coded version of the portion of video data. Inter-coded data can be decoded after the reference data upon which it was predicted is decoded. For example, data encoded using motion compensated prediction comprises a motion vector and a frame identifier identifying the location of the reference data. If the portion of the frame identified by the motion vector and the frame identifier of the inter-coded version is available (e.g., already decoded), then the selective decoder 160 can decode the inter-coded version. If however, the reference data is not available, then the selective decoder 160 can decode the intra-coded version.

The reference data determiner 162, in one aspect, identifies received reference data that indicates where the intra-coded and inter-coded video data in the received encoded video data are located. For example, the reference data may include identifiers of subblocks and/or macroblocks that are used by the selective decoder 160 to locate a position within a frame. The reference data may also include a frame sequence number used to locate a frame within a video frame sequence. Using this received reference data enables a decoder to determine if the reference data upon which inter-coded data depends is available.

Reference data availability can be affected by a user switching a channel of a multi-channel communication system. For example, multiple video broadcasts may be available to the receiver 158, using one or more communication links. If a user commands the receiver 158 to change to a different broadcast channel, then reference data for the inter-coded data on the new channel may not be immediately available. The channel switch detector 164 detects that a channel switch command has been issued and signals the selective decoder 160. Selective decoder 160 can then use information obtained from the reference data determiner to identify if reference data of the inter-coded version is unavailable, and then identify the location of the nearest intra-coded version and selectively decode the identified intra-coded version.

Reference data availability can also be affected by errors in the received video data. The error detector 166 can utilize error detection techniques (e.g., forward error correction) to identify uncorrectable errors in the bitstream. If there are uncorrectable errors in the reference data upon which the inter-coded version depends, then the error detector 166 can signal the selective decoder 160 identifying which video data are affected by the errors. The selective decoder 160 can then determine whether to decode the inter-coded version (e.g., if the reference data is available) or to decode the intra-coded version (e.g., if the reference data is not available).

In certain configurations, one or more of the elements of the encoder device 110 of FIG. 2A may be rearranged and/or combined. The elements may be implemented by hardware, software, firmware, middleware, microcode or any combination thereof. In certain configurations, one or more of the elements of the decoder 150 of FIG. 2B may be rearranged and/or combined. The elements may be implemented by hardware, software, firmware, middleware, microcode or any combination thereof.

Video

Certain configurations described herein can be implemented using MediaFLO™ video coding for delivering real-time video services in TM3 systems using the FLO Air Interface Specification, "Forward Link Only (FLO) Air Interface Specification for Terrestrial Mobile Multimedia Multicast", published as Technical Standard TIA-1099, which is fully incorporated herein by reference for all purposes. Certain configurations define the bitstream syntax and semantics, and decoding processes for delivering these services over the FLO Air Interface layers 412.

The description provided herein, at least in part, forms a compatibility standard for FLO multimedia multicast systems and facilitates a compliant FLO device 304 in obtaining service(s) through any FLO network 302 (FIG. 3) conforming to this standard.

Normative References

The ITU-T Recommendation H.264 and/or ISO/IEC International Standard ISO/IEC 14496-10 advanced video coding (herein referenced as the "H.264/AVC standard") are fully incorporated herein by reference for all purposes and may, in part, be specifically referenced herein.

The definitions in clause 3 of the H.264/AVC standard also apply to the configurations described herein. Additionally, the channel switch frame (CSF) for in accordance with exemplary configurations described herein is defined as a coded picture comprised of a sequence parameter set, and/or a picture parameter set, and/or an instantaneous decoding refresh (IDR) picture. A channel switch frame (CSF) can be encapsulated in an independent transport protocol packet to enable random access points in the coded bitstream or to facilitate error recovery. Channel switch frames (CSFs) are specified herein below.

Conventions used herein for operators, range notation, mathematical functions, variables, syntax elements, tables, and processes, are as specified in clause 5 of the H.264/AVC standard.

Certain configurations described herein include: a description of the scope, normative references, definitions of terms, abbreviations and the organization of the disclosure; and a description of the bitstream syntax, semantics and decoding processes.

Low Complexity Bitstream Format and Decoding for Multimedia Broadcast

The description provided herein, among other things, describes an exemplary bitstream format and the decoding process which provides a low complexity extension for multimedia broadcast. Bitstream conforming to the low complexity extension described by this specification conforms to profiles in A.2 of the H.264/AVC standard with the following additional constraints and extensions: 1) Sequence parameter sets can have profile_idc equal to 66 or 88; 2) Sequence parameter sets can have constraint_set0_flag equal to 0; 3) Sequence parameter sets can have constraint_set1_flag equal to 1; 4) Sequence parameter sets can have constraint_set2_flag equal to 0; 5) B slice type may be present; and/or 6) Slices for B-pictures can have nal_ref idc equal to 0. (The idc represents a profile index.)

In another aspect of the configurations, the bitstream conforms to the low complexity extension described by this specification conforms to profiles in A.2 of the H.264/AVC standard with the constraints and extensions of: 1) Sequence parameter sets can have profile_idc equal to 66 or 88; 2) Sequence parameter sets can have constraint_set0_flag equal to 1; 3) Sequence parameter sets can have constraint_set1_flag equal to 0; 4) Sequence parameter sets can have constraint_set2_flag equal to 1; 5) B slice type may be present; and/or 6) Slices for B-pictures can have nal_ref idc equal to 0.

Channel Switch Frame

Figure 7:
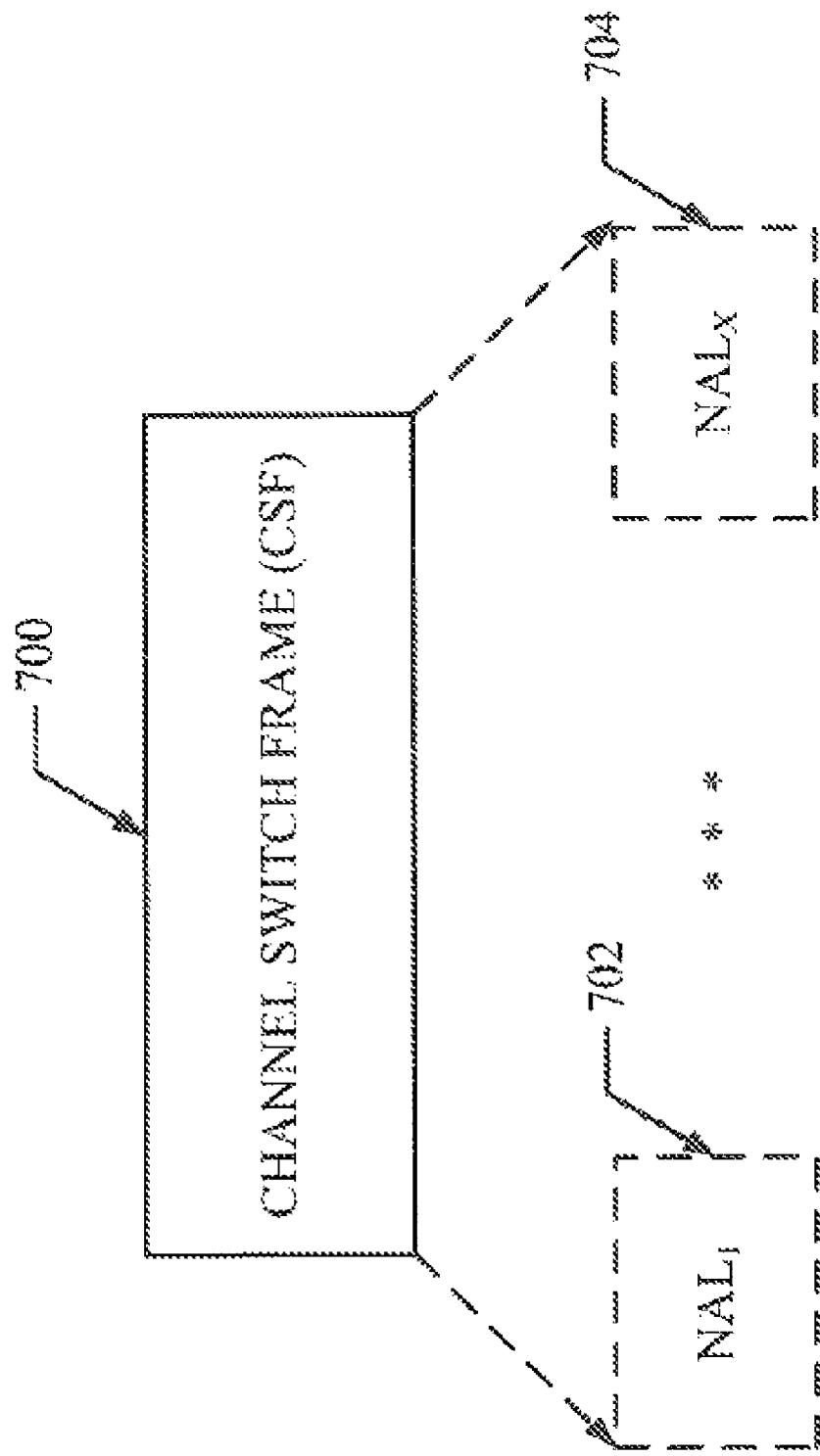
FIG. 7 illustrates an exemplary channel switch frame (CSF).

FIG. 7 illustrates an exemplary channel switch frame (CSF) 700. To enable channel change within the MediaFLO™ environment and to facilitate error recovery, encoder elements 120 according to certain configurations may insert channel switch frames (CSFs). A channel switch frame (CSF) 700 can be comprised of up to 3 NAL units, or more, $NAL_1 \ldots NAL_X$ denoted by reference numerals 702 and 704. X may be 2 or more. Nonetheless, the CSF 700 may have only one NAL unit.

Figure 8:
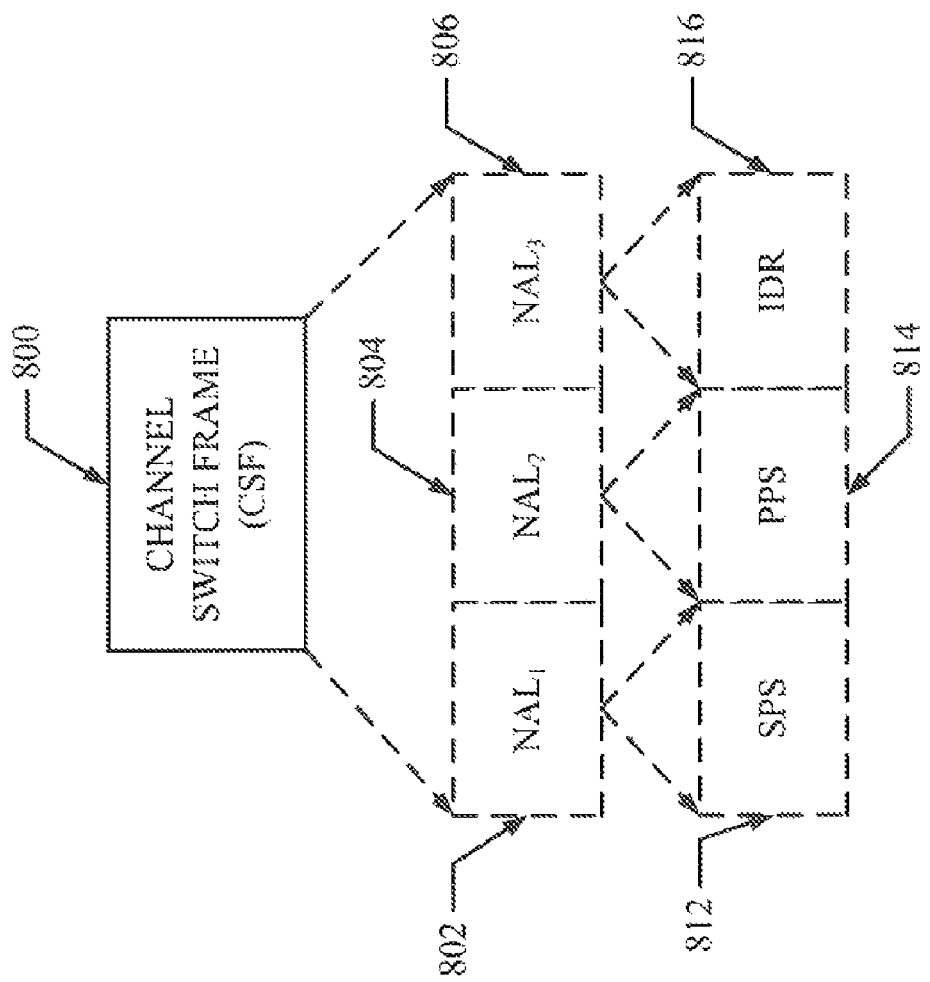
FIG. 8 illustrates an exemplary 3-NAL CSF.

FIG. 8 illustrates an exemplary 3-NAL CSF 800. In this example, the CSF 800 is comprised of 3 NAL units 802, 804 and 806. If 3 NAL units are used, in certain situations, which if present, can be in the bitstream in the following order: a sequence parameter set (SPS) 812, a picture parameter set (PPS) 814, and an instantaneous decoding refresh (IDR) 816. The IDR NAL unit may be a low-quality NAL IDR unit.

This CSF arrangement is shown in Table 1. Table 1 identifies which NAL unit types are being used for the CSF 800. In the exemplary configuration, the NAL unit types include Type numbers 7, 8 and 5. Nonetheless, in other circumstances, the IDR NAL type 5 may be replaced with an I-frame (coded slice) NAL type 1. RBSP stands for raw byte sequence payload and is represented in the column titled RBSP syntax structure. The column nal_unit_type represents the NAL unit type number used herein for the CSF. The column C represents other supported structures. For example, the numbers 2, 3 and 4 represent the data partitions A, B and C. The number 1 also represents the coded slice NAL unit 1. The number 0 is unspecified.

TABLE 1

NAL units and RBSP syntax for channel switch frames

| Content of NAL unit | RBSP syntax structure | nal_unit_type | C |
|---|---|---|---|
| Sequence parameter set | seq_parameter_set_rbsp( ) | 7 | 0 |
| Picture parameter set | pic_paramete_set_rbsp( ) | 8 | 1 |
| Coded slices of an IDR picture | slice_layer_without_partitioning_rbsp( ) | 5 | 2, 3 |
| Coded slice | slice_layer_with_partitioning_rbsp( ) | 1 | 2, 3, 4 |

The syntax, semantics, and decoding processes for these NAL units are as specified in the H.264/AVC standard.

Specifications of Channel Switch Frame Parameters

The semantics of channel switch frame (CSF) bitstreams have different requirements for several syntax elements, variables, and functions from those of the H.264/AVC standard.

Figure 9:
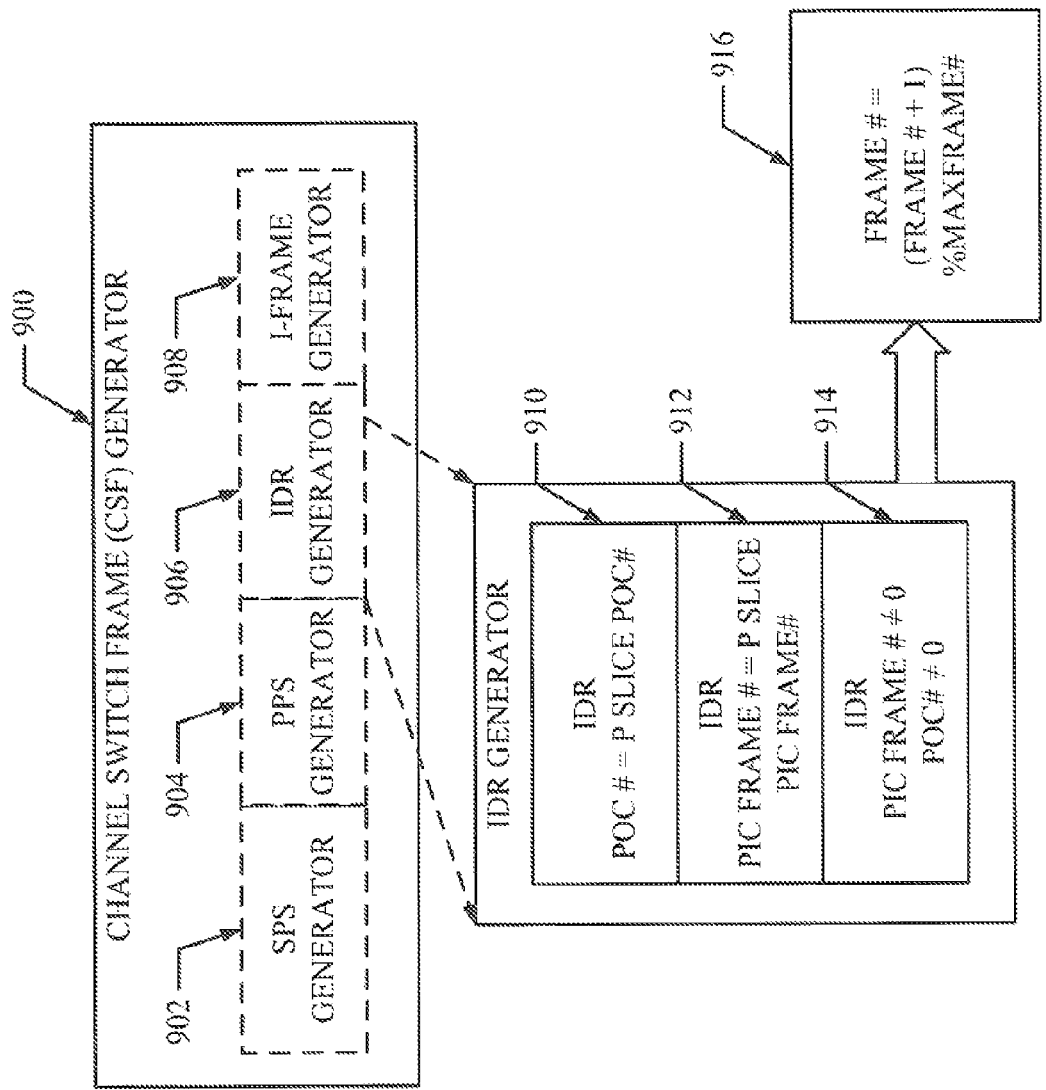
FIG. 9 illustrates a channel switch frame generator.

FIG. 9 illustrates a channel switch frame (CSF) generator 900. The CSF generator 900 includes a SPS generator 902, a PPS generator 904, a IDR generator 906 and an I-frame generator 908. The following requirements differ from the H.264/AVC standard. The SPS generator 902 allows the resultant sequence parameter set (SPS) NAL of a CSF 800 to have a pic_order cnt_type equal to 0. Additionally, the SPS generator 902 allows the resultant sequence parameter set (SPS) NAL of a CSF 800 to have a gaps_in_frm_num_value_allowed flag equal to 0.

The PPS generator generates a resultant PPS NAL unit. The I-frame generator 908 generates an I-frame NAL unit. The IDR generator 906 generates a resultant IDR NAL unit such that the syntax element pic_order_cnt_lsb for the IDR picture may be non-zero. The IDR picture PicOrderCnt( ) is equal to that of the corresponding P slice PicOrderCnt( ). Additionally, the syntax element frame_num of the IDR picture may be non-zero. The IDR picture frame_num is equal to that of the corresponding P slice frame_num. The following picture frame_num can be equal to (frame_num+1) % MaxFrameNum.

Thus, the IDR generator includes an IDR picture order count (POC) number calculator 910 which sets the IDR NAL's POC number to equal the P-slice POC number. The IDR generator also includes an IDR picture frame number calculator 912 which sets the picture frame number equal to the P-slice picture frame number. The IDR generator also ensures in some instances that the picture frame number and the POC number are non-zero. The encoder device 110 tracks the frame number at block 916 where the picture frame_num can be equal to (frame_num+1) % MaxFrameNum.

The encoder device 110 may track a variable PrevRefFrameNum such that it can be set equal to the value of the CSF frame_num minus 1.

Channel Switch Frame Decoding

Figure 10:
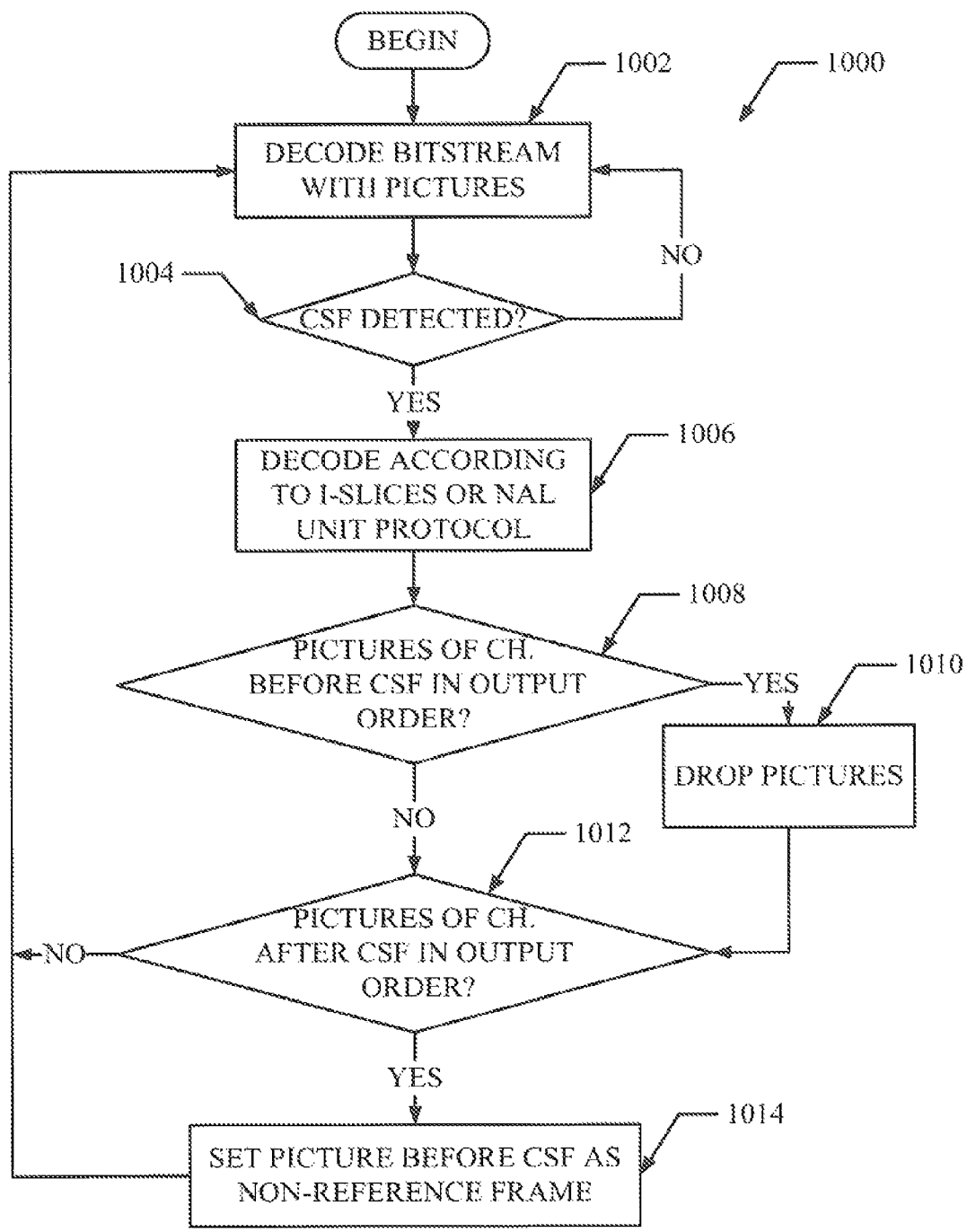
FIG. 10 illustrates a process for decoding a bitstream with CSFs.

FIG. 10 illustrates a process 1000 for decoding a bitstream with CSFs. The decoding process 1000 used for the I-slices as specified in clause 8 of the H.264/AVC standard can be used to decode the channel switch frame (CSF) if an IDR NAL unit is substituted with an I-slice NAL unit (coded slice of NAL type 1), as generated by the I-frame generator 908. The pictures in the requested channel with output order (display) before the channel switch frame (CSF) can be dropped. There is no change to the decoding of future pictures (in the sense of output order). The future pictures following the CSF can not use any pictures with output order before the CSF as reference frames.

In various configurations below, flowchart blocks are performed in the depicted order or these blocks or portions thereof may be performed contemporaneously, in parallel, or in a different order.

Thus, the decoding process 1000 begins with block 1002 where a bitstream with pictures are decoded. Block 1002 is followed by block 1004 where a determination is made whether a CSF is detected. If the determination is "NO," then the block 1004 loops back to block 1002 where further decoding of the bitstream takes place.

However, if the determination at block 1004 is "YES," then the CSF is decoded according to the I-slices and/or the NAL unit type protocol. Block 1006 is followed by block 1008 where a determination is made whether there are any pictures of the requested channel before the CSF in output order. If the determination is "YES," those pictures are dropped at block 1010. Block 1010 is followed by block 1012. However, if the determination at block 1008 is "NO," then block 1008 is followed by block 1012. At block 1012, a determination is made whether there are any picture of the requested channel after the CSF in output order. If the determination is "YES," the pictures before the CSF in the output order are set as non-reference frames at block 1014. Block 1010 is followed by block 1012. However, if the determination is "NO," then block 1012 loops back to block 1002. Block 1014 also loops back to block 1002 where normal decoding takes place. The non-reference frame may be set by flushing the frame or by forcing the frame as a non-reference frame.

Sync Layer

Figure 4:
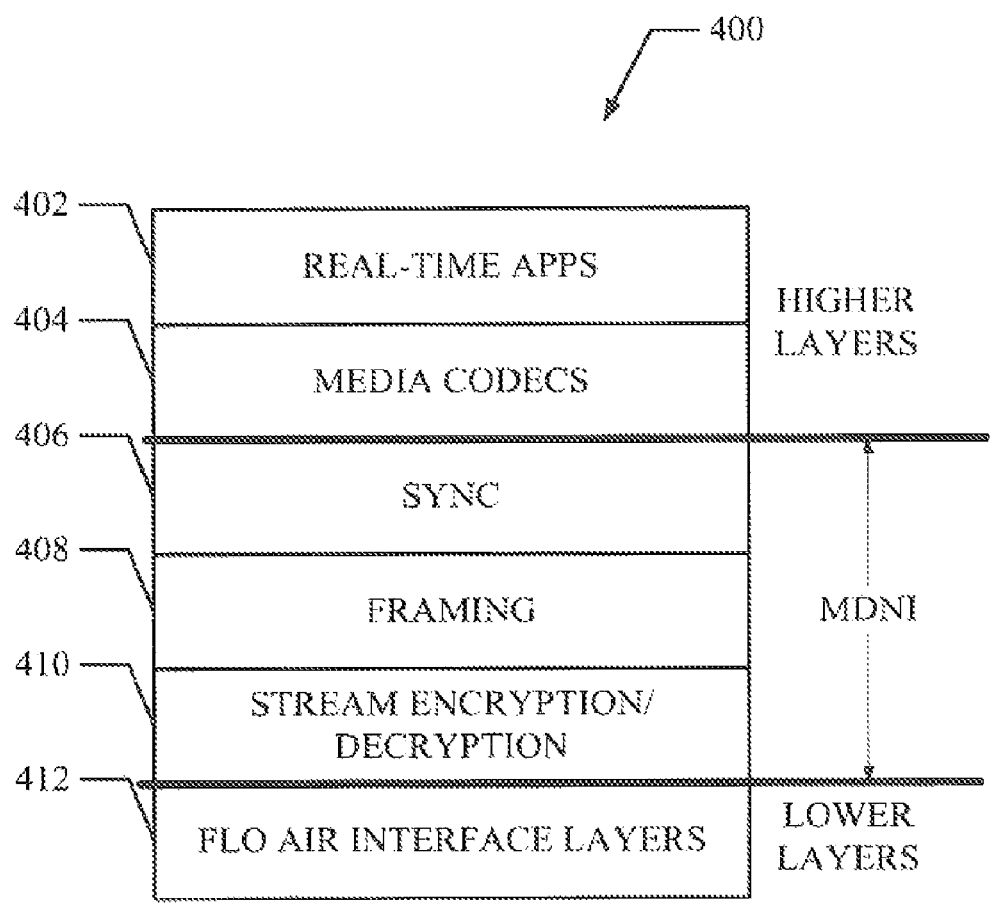
FIG. 4 illustrates exemplary protocol layers for a realtime service within a FLO network.

The MediaFLO™ system can deliver at least three types of content: realtime, non-realtime and IP datacast (e.g., multicast, unicast, etc.). The Multicast device network Interface (MDNI) for delivery of realtime service is shown in FIG. 4.

Figure 3:
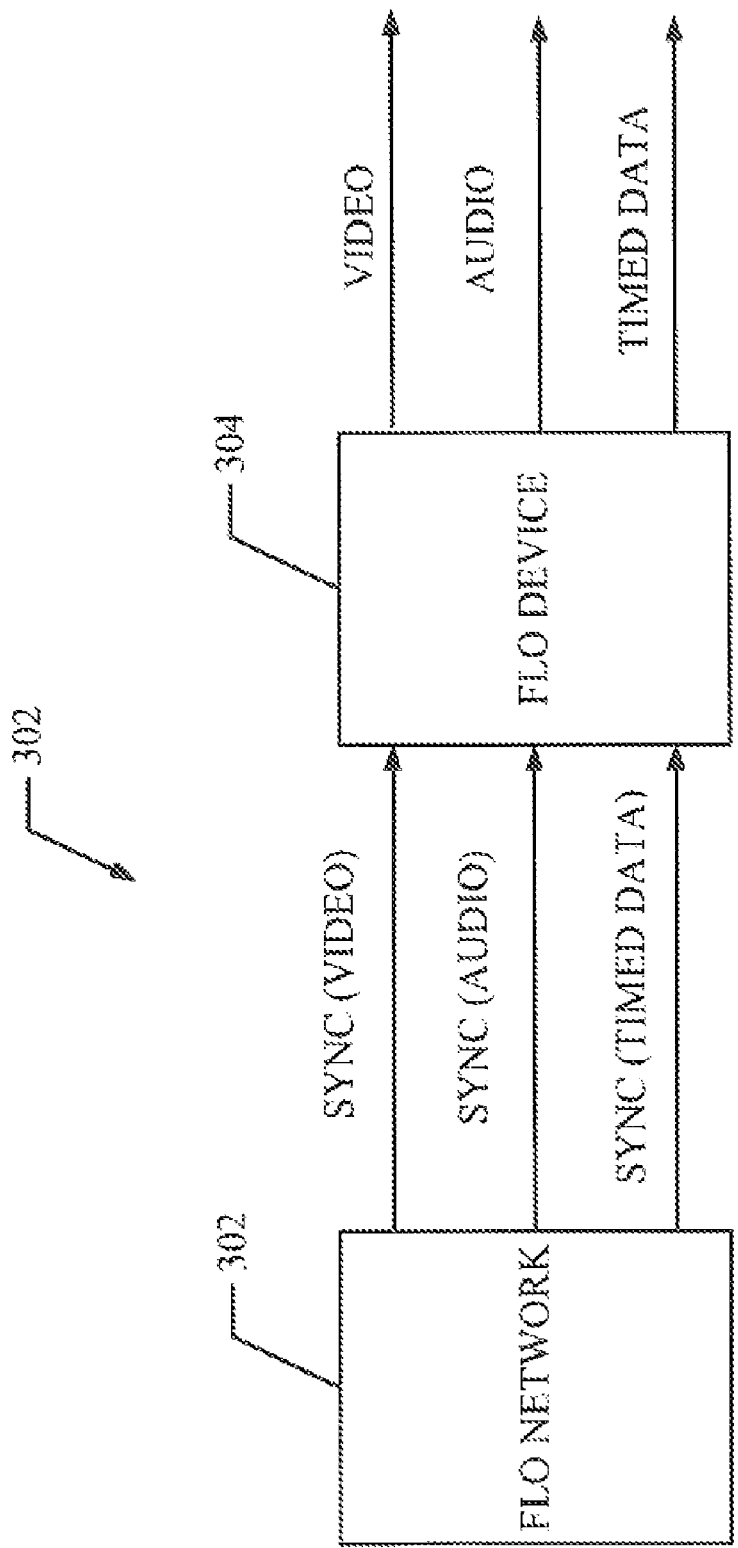
FIG. 3 illustrates an exemplary relationship between sync layer messages and realtime media stream output to/by the device in a FLO network.

FIG. 3 illustrates an exemplary relationship between sync layer messages and real-time media stream output to/by a device 304 in a FLO network 302. An exemplary FLO network 302 can support continuous realtime delivery of streaming content to a device 304. Each stream can be delivered as a separate flow, and related flows can be identified as belonging to a common service, or set of services, through the use of system information. The network 302 additionally can provide data allowing the devices to synchronize the real time media streams with each other and with the presentation timing requirements of the content. The layer for combining media streams and synchronization data is known as the sync layer 406.

The device 304 required to access a realtime service uses the system information to locate the service. After processing the metadata related to the service, such as, for example, the title and rating of the presentation currently available on the service, the device 304 can select the appropriate flow and play the received stream. The timing and the synchronization of the presentation of these streams can be controlled by the protocols herein.

Protocol Architecture

FIG. 4 illustrates exemplary protocol layers 400 for a real-time service within a FLO network 302. The real-time service can make use of the services of the framing layer 408, described herein, and the stream encryption/decryption layer 410, also described herein. It can consist of at least two sub-layers: the media codec layer 404 and the sync layer 406. A real-time apps layer 402 is shown in the higher layers section of the protocol layers 400.

The media codec layer 404 supports media-specific codecs which are outside the scope of this configuration. A media codec supplies a sequence of media frames to the sync layer 406 in the network. Each media frame can be identified by a presentation time stamp (PTS), which generally specifies the time at which the frame is to be presented, and an associated frame ID, which identifies the relative position of the frame in the sequence of frames with a superframe. A video source codec may generate multiple media frames with the same PTS and frame ID within a superframe.

For certain media types, notably video, the media codec layer 404 in the network 302 also supplies metadata to the sync layer 406 which the sync layer 406 in the device 304 may use to assist in acquiring and recovering the sequence of media frames to be delivered to the media codec layer 404 in the device 304.

The sync layer 406 is responsible for adapting the media frames as required according to media type, and for providing media synchronization and presentation timing. The sync layer 406 transports a sequence of sync layer packets. A sync layer packet conveys either a media frame or an adaptation frame, as described below. A sync layer packet conveying a media frame is formed by adding a sync header (SH) to the media frame. The sync header (SH) consists of a media type, a common media header, and a media specific header, as described in further detail below.

Additionally, the sync layer 406 may convey certain metadata specific to each media type. This metadata is conveyed in two ways. First, as noted, media-specific extensions may be included in the sync header of sync layer packets. Second, sync layer packets may be used to convey adaptation frames which are generated within the sync layer 406 and interleaved between sync layer packets conveying media frames in the same flow. Different types of adaptation frame are identified by an application ID in the sync header for the application frame.

Figure 5A:
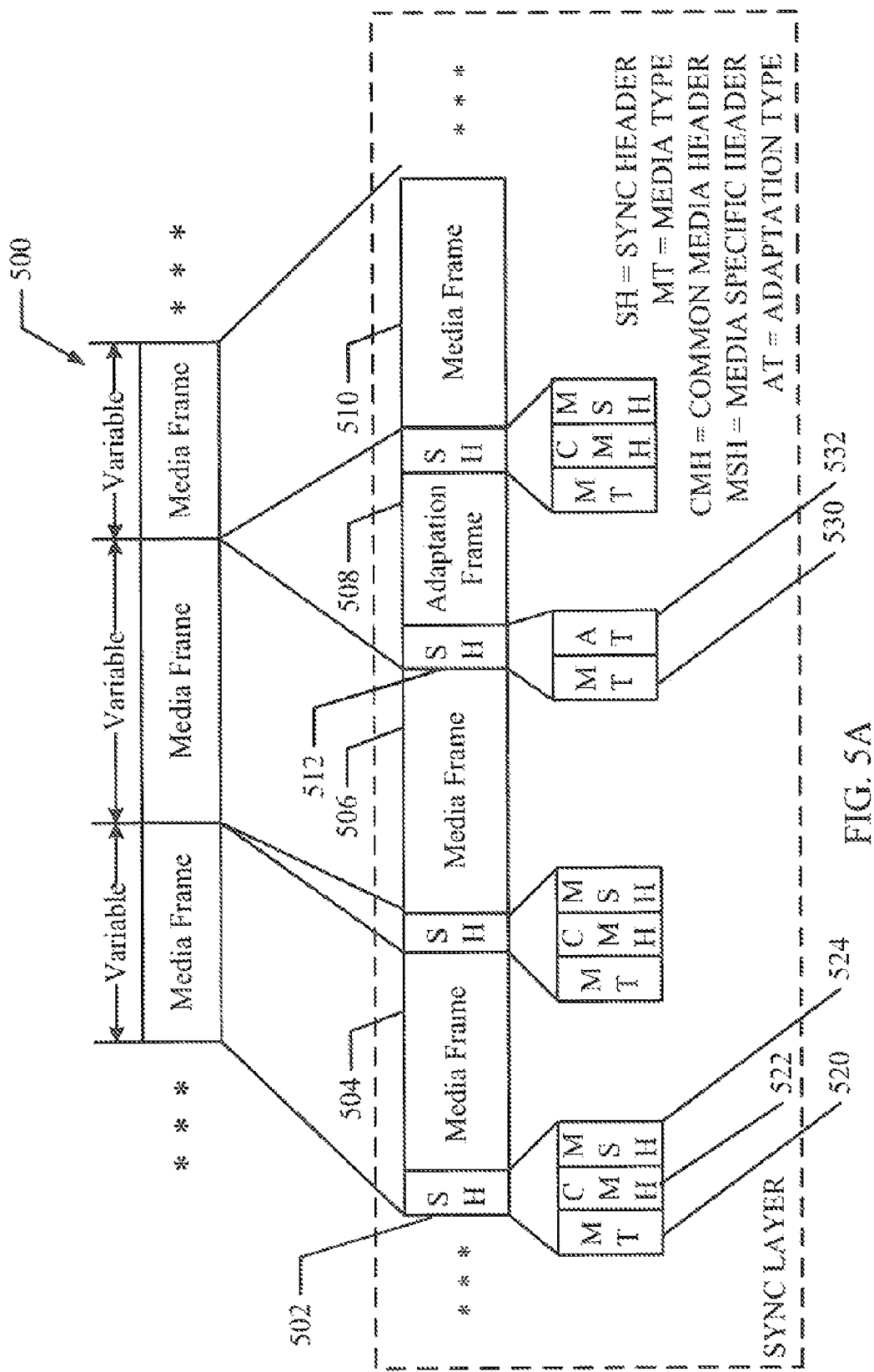
FIGS. 5A-5B illustrate alternative exemplary relationships between sync layer packets and the media frames.
Figure 5B:
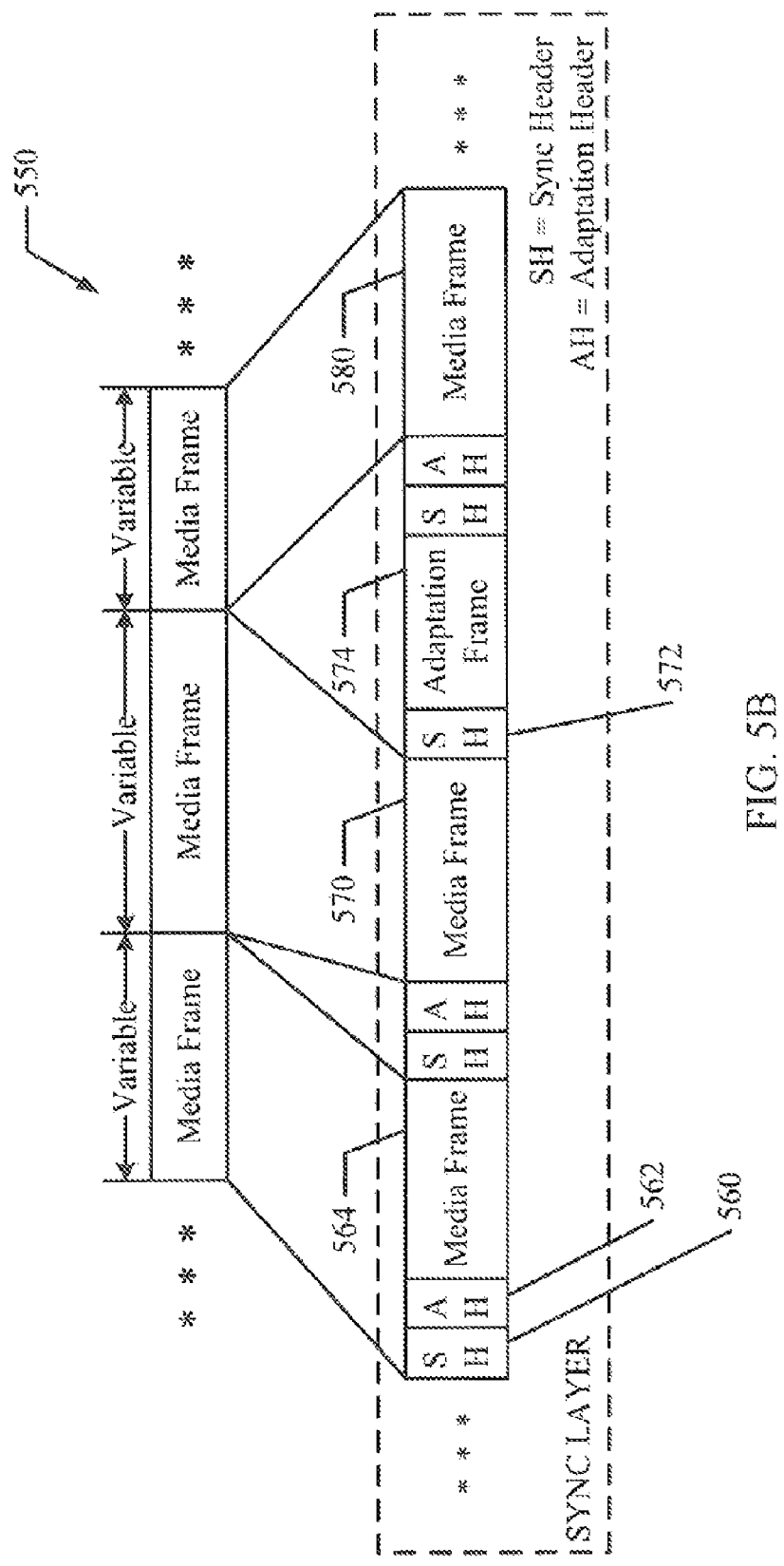

FIG. 5A and FIG. 5B illustrate alternative exemplary relationships between sync layer packets and the media frames according to certain configurations. FIG. 5A illustrates a first exemplary sync layer packet 500 encoded by encoder device 110. The sync layer packet 500 is comprised of, by way of example, a plurality of media frames 504, 506, and 510 of variable length. Preceding each media frame 504, 506 and 510 there is a corresponding sync header (SH) 502. The sync header (SH) 502 includes three components. The three components include a media type (MT) 520, a common media header (CMH) 522 and a media-specific header (MSH) 524, all of which are described in detail herein below.

In example of FIG. 5A, an adaptation frame 508 is inserted between media frames 506 and 510. The adaptation frame 508 is preceded by a sync header (SH) 512 having two components. The two components of sync header (SH) 512 includes a media type (MT) 530 and an adaptation type (AT) 532.

FIG. 5B illustrates a second exemplary sync layer packet 550 encoded by encoder device 110. The sync layer packet 550 is comprised of, by way of example, a plurality of media frames 564, 570, and 580 of variable length. Preceding each media frame 564, 570 and 580 there is a corresponding sync header (SH) 560 and an adaptation header (AH) 562. In example of FIG. 5B, an adaptation frame 574 is inserted between media frames 570 and 580. The adaptation frame 574 is preceded by a sync header (SH) 572.

Real Time Flow Configuration Options

For flows providing real time data the flow configuration options can be configured as follows: 1) FASB_ALLOWED denoted as not selected; 2) CHECKSUM_ACTIVE denoted as configurable; and 3) STREAM_ENCRYPTION_ACTIVE denoted as configurable.

Media Codec and Framing Layer Interfaces

A realtime service may consist of more than one type of streaming component, e.g. video, audio and text used for commentary or closed captioning, possibly in multiple language streams and even multiple combinations of these. Each streaming component can be conveyed in a separate flow or multiple streaming components can be conveyed in a single flow.

With respect to FIG. 3, each type of content is encoded and formatted appropriately. Three types of streaming content are supported, however those skilled in the art will appreciate the extendibility of the concepts presented herein: Video (e.g. H.264); Audio (e.g. HE-AAC version 2); and/or Timed Data (e.g. 3GPP PSS Timed Text)

Adaptation frames 508 or 574 conveying metadata associated with the flow are considered as a fourth content type.

The media codec interface in the network 302 supplies a sequence of media frames 504, 506, 510, 564, 570, and 580 to the sync layer 406. In the device 304, the sync layer 406 supplies a sequence of media frames (e.g. 504, 506 and 510) to the media codec. The media frames (e.g. 504, 506 and 510) can be aligned to byte boundaries when passed across the interface between the sync layer 406 and the media codec layer 404 in both the device 304 and the network 302.

The sync layer 406 in the network 302 adds sync layer headers (e.g. 502) to the media frames (e.g. 504, 506 and 510) to create sync packets, interleaves them with sync packets delivering adaptation frames 508, and delivers the resultant sync packets to the framing layer 408 for transmission. Sync packets bearing video media frames may be transmitted in either the base layer modulation component or the enhanced layer modulation component, as specified by the video media codec layer 404. Other sync packets can be transmitted in the base layer component.

The sync layer 406 in the device 304 delivers media frames (e.g. 504, 506 and 510) to the media codec layer 404 in increasing order of frame ID in each superframe. The delivery order of video media frames is subject to certain additional constraints in the case where there is more than one video media frame with the same frame ID.

The maximum size of a media frame (e.g. 504, 506 and 510) can not exceed $P_{MAX\_RT}$ bytes, where $P_{MAX\_RT}$ is a configurable FLO system parameter, and as such, can be configured to facilitate a variety of media frame sizes.

The description below specifies the adaptation of the service packets provided by the media codecs for transport over the sync layer 406 for each media type, and the media-specific interactions of the sync layer 406 with the framing layer 408.

Video Content

Network Media Codec Interface

Video frames may be generated at any of the nominal rates specified in Table 8, below. The nominal frame rate may change within a superframe, e.g. because content from different sources is provided at different rates to the network. For each superframe, the media codec layer 404 can indicate to the sync layer 406 the number of media frames which it wishes to be presented to the user. Video frames consist of an integral number of bytes. Therefore it is not necessary to provide byte alignment for a media frame transporting a video frame.

The media codec layer 404 can present video frames to the sync layer 406 in decode order. The media codec layer 404 can provide the following metadata to the sync layer 406 with each video frame: 1) the PTS and frame ID; 2) the Frame Rate associated with the frame, identifying the instantaneous rate at which video frames are to be presented to the user; 3) whether the frame is a Random Access Point (RAP), which the device 304 may use to acquire the video stream; 4) whether the frame is a reference frame; 5) whether the frame contains essential video information or additional video information; and/or 6) whether the frame is intended for transmission in the base layer component or the enhanced layer component. The criteria by which video information is determined to be essential or additional are determined by the media codec layer 404.

The value of the frame ID can be set to zero for the first video frame in the superframe. It can either increment or remain the same for each subsequent video frame presented to the sync layer 406, up to and including the number of media frames to be presented by the device 304.

The delivery of frames with the same frame ID across the interface is subject to the some restrictions. A first restriction is that if the media codec layer 404 generates one or more RAP frames and one or more alternate frames with the same frame ID, it can present the RAP frame(s) to the sync layer 406 before the alternate frames. A second restriction is that if the media codec layer 404 generates two frames for the same frame ID which differ only in the level of video quality, the low quality frame can be transmitted in the base layer component and the high quality frame can be transmitted in the enhanced layer component.

Network Framing Layer Interface

The sync layer 406 can group the sync packets conveying video frames according to whether they are transmitted in the base layer or the enhanced layer component. Each group can be processed separately.

The sync layer 406 can provide the sync packets for each group to the framing layer 408 in increasing order of frame ID. Two sync packets with the same frame ID in the same component can be provided to the framing layer 408 in the order they were received from the media codec layer 404.

Device Framing Layer Interface

The device 304 can recover sync packets transmitted from the base layer and the enhanced layer components, and can recover the order in which they are to be delivered across the device media codec interface by processing them together.

Device Media Codec Interface

The sync layer 406 in the device 304 can present video media frames (e.g. 504, 506 and 510) to the media codec layer 404 in decode order, as determined from the frame ID, subject to the additional recommendations (all or some of which may be eliminated for alternate configurations). A first recommendation is that if the sync layer 406 detects a video media frame with the RAP flag set ("RAP Frame") and one or more non-RAP frame(s) with the same frame ID, then one of two conditions are further evaluated. The first condition (for the first recommendation) is that if the sync layer 406 has not acquired the video stream, it can deliver the RAP Frame across the media codec interface (MCI), and can discard the non-RAP frame(s). Otherwise (the second condition), the sync layer 406 can discard the RAP Frame and can deliver the non-RAP frame(s) across the media codec interface (MCI), as appropriate. The RAP Frame may be a CSF.

A second recommendation is that if the sync layer 406 detects two video media frames with identical sync layer headers (SH), it can deliver the frame received in the enhanced layer to the media codec layer 404 and discard the frame received in the base layer.

A third recommendation is that if the sync layer 406 detects a video media frame with essential video information, and a second video media frame with the same frame ID and additional video information. Two additional conditions are considered. In the first condition of the third recommendation, if the media codec layer 404 does not support processing of additional video information, the sync layer 406 can discard that video media frame and deliver the video media frame with essential video information to the media codec layer 404. In the second condition of the third recommendation, if the first condition is not met, the sync layer 406 can deliver both video media frames to the media codec layer 404.

Figure 16:
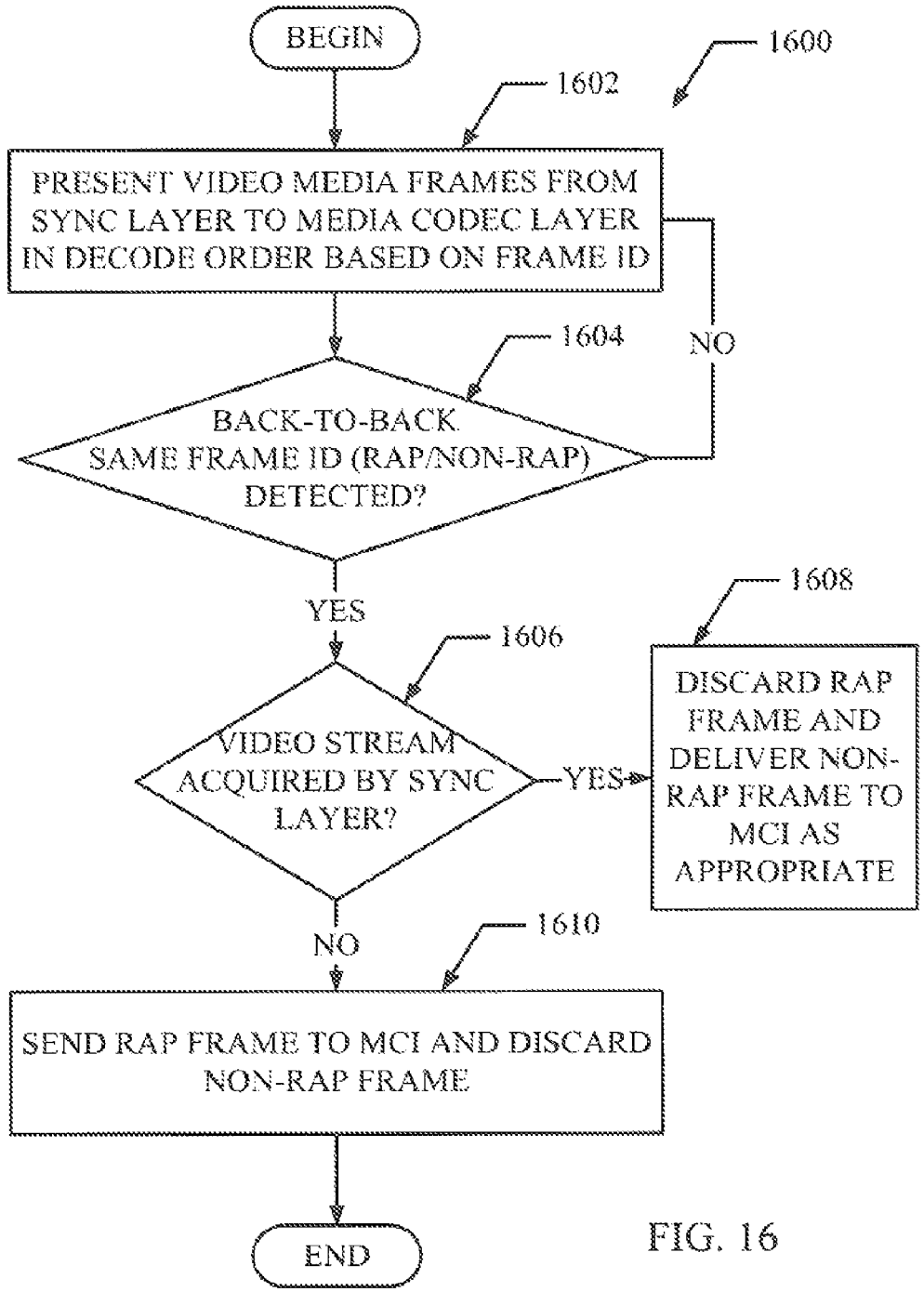
FIG. 16 illustrates a flowchart of a process for sync layer to media layer processing at a device.

FIG. 16 illustrates a flowchart of a process 1600 for sync layer 406 to media codec layer 404 processing at a device 304. The process 1600 begins with block 1602 where video media frames are presented from the sync layer 406 to the media codec layer 404 in decode order based on the frame ID number. Block 1602 is followed by block 1604 where a determination is made whether there are two back-to-back frames with the same frame ID number and which one frame is a RAP frame (e.g. CSF) and the other is a non-RAP frame. If the determination is "NO," the block 1604 loops back to block 1602. However, if the determination is "YES," then block 1604 is followed by block 1606 where a determination is made whether the sync layer 406 has acquired the video stream. If the determination is "YES," then block 1606 is followed by block 1608 where the RAP frame is discarded and the non-RAP frames is delivered to the MCI as appropriate. If the determination is "NO," then block 1606 is followed by block 1610 where the RAP frame is sent to the MCI and the non-RAP frames is discarded.

FIG. 17 illustrates an example of a bitstream 1700 generated by the network 302 with back-to-back same frame identification numbers. The bitstream 1700 is similar to that shown and described in relation to FIG. 5A. By way of example, the media frame 1704 includes a P-frame (1) for a channel denoted by CH-CNN. The media frame 1704 includes a sync header (SH) 1702. Sync header (SH) 1702 is similar to the sync header (SH) 502 previously described.

In this example, assume that a CSF has been inserted to effectuate a channel change such as to CH-ESPN. The CSF is represented by media frame 1708 and includes a sync header (SH) 1706. The CSF is a RAP frame and will have a CMH 1720 with a frame identification number. For illustrative purposes, an adaptation frame with its corresponding SH is shown following the CSF (media frame 1708). The media frame 1712 is a designated as a non-RAP frame and is preceded by sync header (SH) 1710. In this bitstream 1700, media frames 1708 and 1712 are back-to-back. The CSF intends to switch channels such as to channel CH-ESPN. To effectuate the channel change, the media frame 1712 is a P-frame (2) and has a CHM in sync header 1710 with a frame identification number which is the same as the frame identification number in sync header (SH) 1706 for the CSF (media frame 1708).

The media frame 1712 is followed by media frame 1716 having a sync header 1714. The media frame 1716 may be a B-frame. In output order, the B-frame is before the P-frame. Hence, the B-frame is discarded or dropped (See FIG. 10).

In relation to the description provided in FIG. 10, the media frame 1704 needs to be designated as a non-reference frame. Since there is a channel change, the frame 1704 cannot serve as a reference frame for a video frame in another channel. The media frame 1704 can be set as a non-reference frame or flushed from a buffer. Nonetheless, other means of eliminating a media frame from serving as a reference frame can be used.

Audio Content

Network Media Codec Interface

Audio frames are generated at a fixed rate according to the type of audio codec in use. However, the audio frame rate may not be an integral multiple of the superframe rate. For each superframe, the media codec layer 404 can indicate to the sync layer 406 the number of media frames which it wishes to be presented.

A frame ID can be associated with each audio frame presented to the sync layer 406. The frame ID may be assigned by either the media codec layer 404 or the sync layer 406. The value of the frame ID can be set to zero for the first audio frame in the superframe. The value can increment for each subsequent audio frame presented to the sync layer 406, up to and including the number of media frames to be presented by the device 304.

The media codec layer 404 in the network 302 can present audio frames to the sync layer 406 in the order they are generated. An audio frame may consist of a non-integer number of bytes. The media codec layer 404 can achieve byte-alignment according to the means specified for the type of audio codec in use.

The media codec layer 404 can provide metadata to the sync layer 406 in association with each audio frame. The metadata includes a frame ID, if it is assigned by the media codec layer 404.

Whether the Frame is a RAP Frame

Whether the frame contains essential audio information or additional audio information. The criteria by which audio information is determined to be essential or additional are determined by the media codec layer 404.

Network Framing Layer Interface

Sync packets containing audio frames can be transmitted in the modulation component directed by the media codec layer 404. The audio frames received within each modulation component can be presented to the framing layer 408 in the order they are generated.

Device Framing Layer Interface

The sync layer 406 in the device 304 can process sync packets in the order they are received across the framing layer interface.

Device Media Codec Interface

The sync layer 406 in the device 304 can present audio frames to the media codec layer 404 in the order they are extracted from the sync packets.

Timed Data Content

Network Media Codec Interface

Timed Data frames are generated at a variable rate. Typically, but not necessarily, there is at most one Timed Data frame per superframe in a Timed Data flow, as best seen in FIG. 3.

A frame ID can be associated with each timed data frame presented to the sync layer 406. The frame ID may be assigned by either the media codec layer 404 or the sync layer 406. The value of the frame ID can be set to zero for the first timed data frame in the superframe. The value can increment for each subsequent timed data frame presented to the sync layer, up to and including the number of media frames to be presented by the device.

The media codec layer 404 in the network can present Timed Data frames to the sync layer 406 in the order they are generated. Timed Data frames may consist of a non-integer number of bytes. Byte-alignment can be achieved according to the means specified for the type of timed data in use. The metadata provided by the media codec layer 404 to the sync layer 406 in association with each timed data frame, if any, is dependent on type of data.

Network Framing Layer Interface

Sync packets containing timed data frames can be transmitted in the modulation component directed by the media codec layer 404. The timed data frames received within each modulation component can be presented to the framing layer in the order they are generated.

Device Framing Layer Interface

The sync layer 406 in the device can process sync packets in the order they are received across the framing layer interface.

Device Media Codec Interface

The sync layer 406 in the device can present timed data frames to the media codec layer 404 in the order they are extracted from the sync packets.

Sync Layer Acquisition

Figure 6:
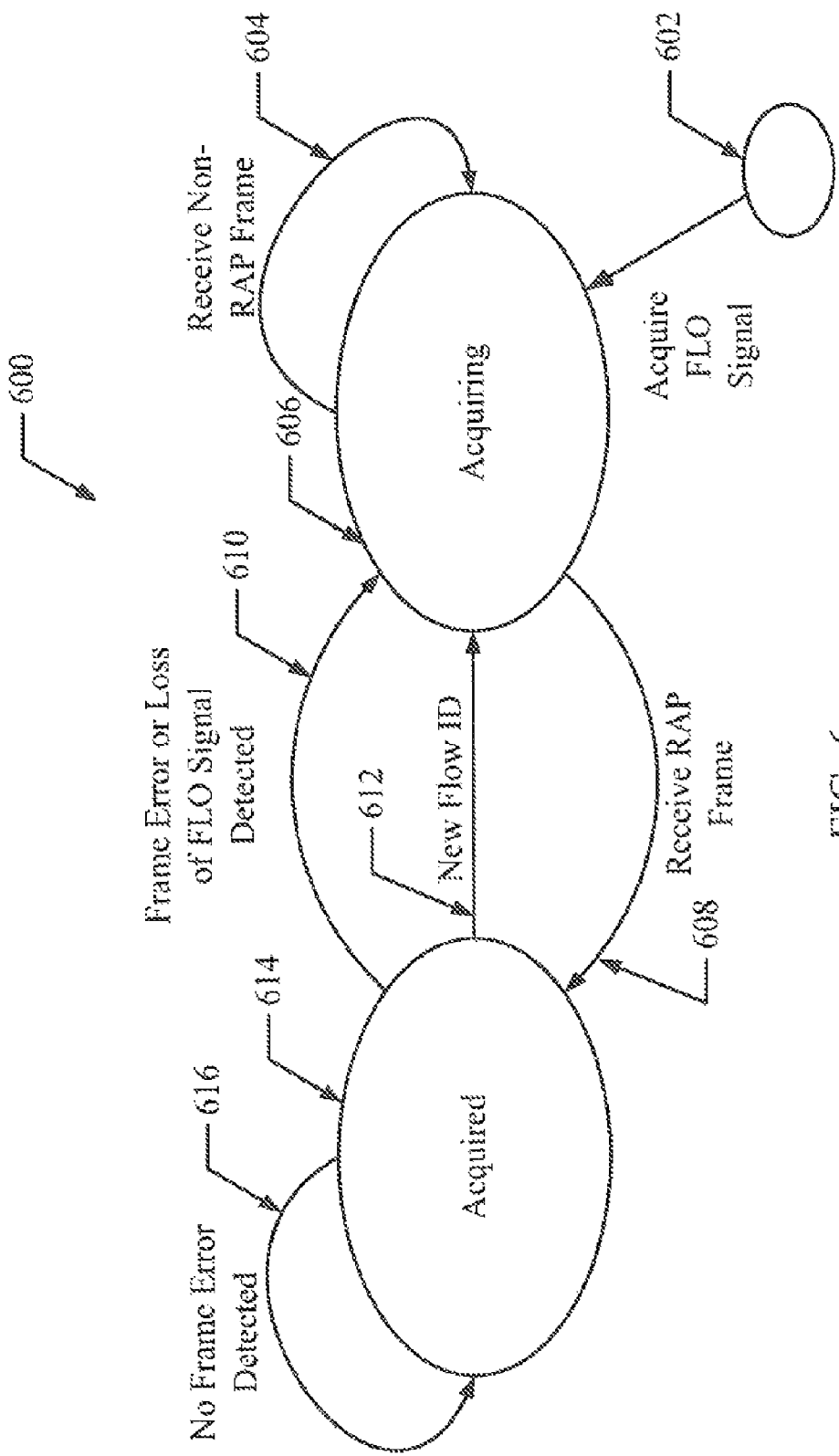
FIG. 6 illustrates an exemplary state machine for processing the sync layer for an individual flow in the device.

FIG. 6 illustrates an exemplary state machine 600 for processing the sync layer 406 for an individual flow in the device according to certain configurations. The state machine 600 illustrates the transitions between each state and the processing undertaken in each state.

Acquiring State

The device 304 can enter the Acquiring state 606 in any of the following circumstances: 1) acquisition of the FLO signal denoted by 602; 2) receipt of an indication from the framing layer 408 that the flow ID has changed, denoted by 612; 3) loss of a FLO signal, denoted by 610, when in the Acquired State 614; 4) detection of a media frame with errors, also denoted by 610, while in the Acquired State 614; 5) errors may be signaled by the framing layer 408 or detected by the cyclical redundancy check (CRC), if CRC processing is configured. Additionally, when non-RAP frame is received, denoted by 604, the Acquiring state 606 may be entered.

In the case of video, the device 304 may use information provided by the Video sync layer Directory, if available, to determine the nature of the media frames affected by the error. The device 304 may be able to determine that error recovery procedures are possible without reentering the Acquiring State 614.

Acquired State

On receipt of a RAP frame, denoted by 608, that is not in error, the device 304 can enter the Acquired State 614. The Acquired State is entered when no frame error is detected, denoted by 616 when in the Acquired State 614.

While in the Acquiring State 614, the device 304 can process media frames provided by the framing layer 408. Valid media frames can be delivered to the media codec layer 404.

Sync Header (SH)

Figure 11:
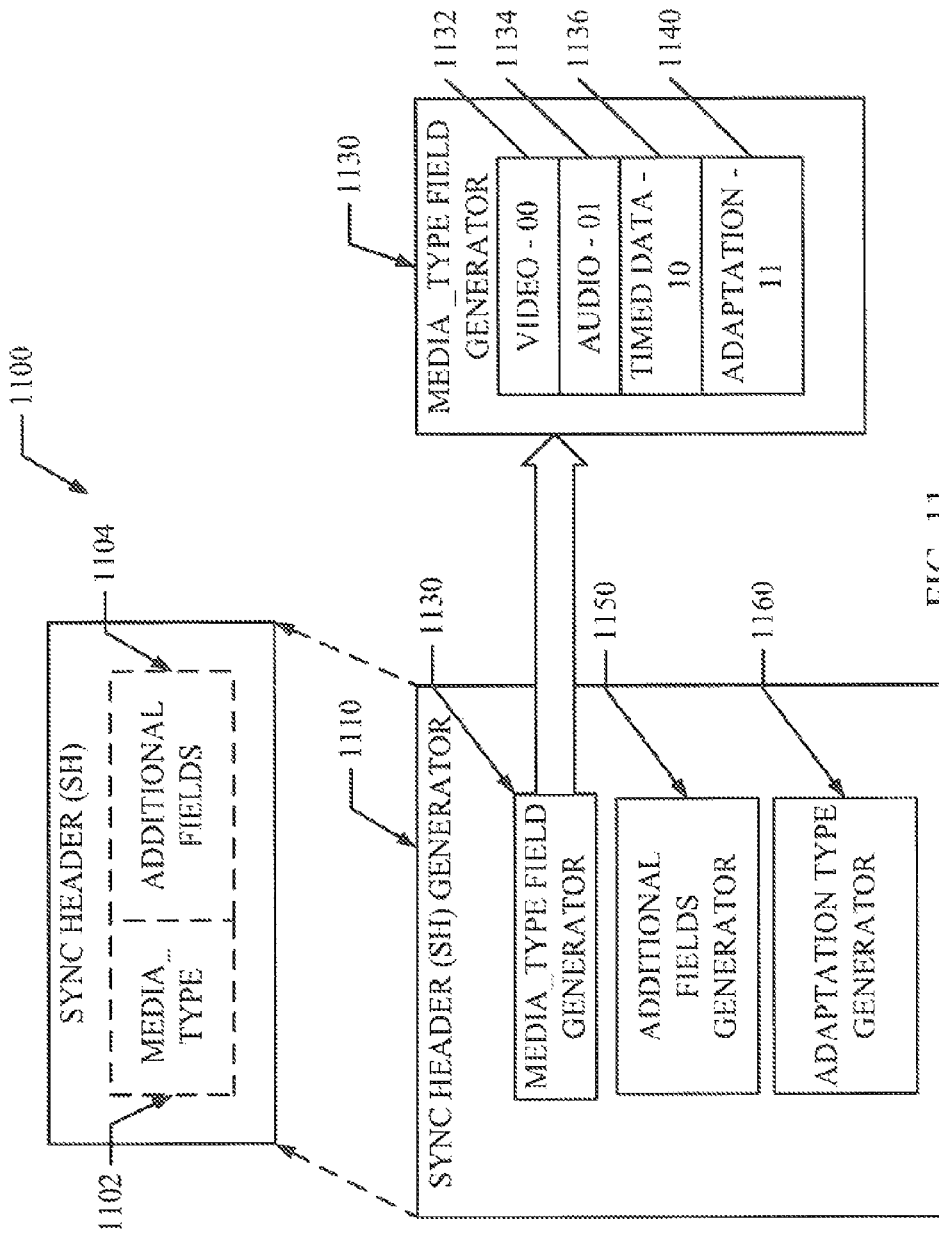
FIG. 11 illustrates a sync header generator generating a sync header.

FIG. 11 illustrates a sync header generator 1110 generating sync header 1100. The sync header generator 1110 includes a media field type generator 1130 which generates media-type codes. The media-type codes are extracted for inserting in the format of the sync header 1100 and include 00 for video at block 1132, 01 for audio 1134, 10 for timed data at block 1136 and 11 for adaptation at block 1140. The sync header generator 1110 also includes an additional fields generator 1150. The sync header generator 1110 also generates the adaptation type (AT), as shown in FIG. 5A, by the adaptation type generator 1160 shown in FIG. 12B.

Figure 12A:
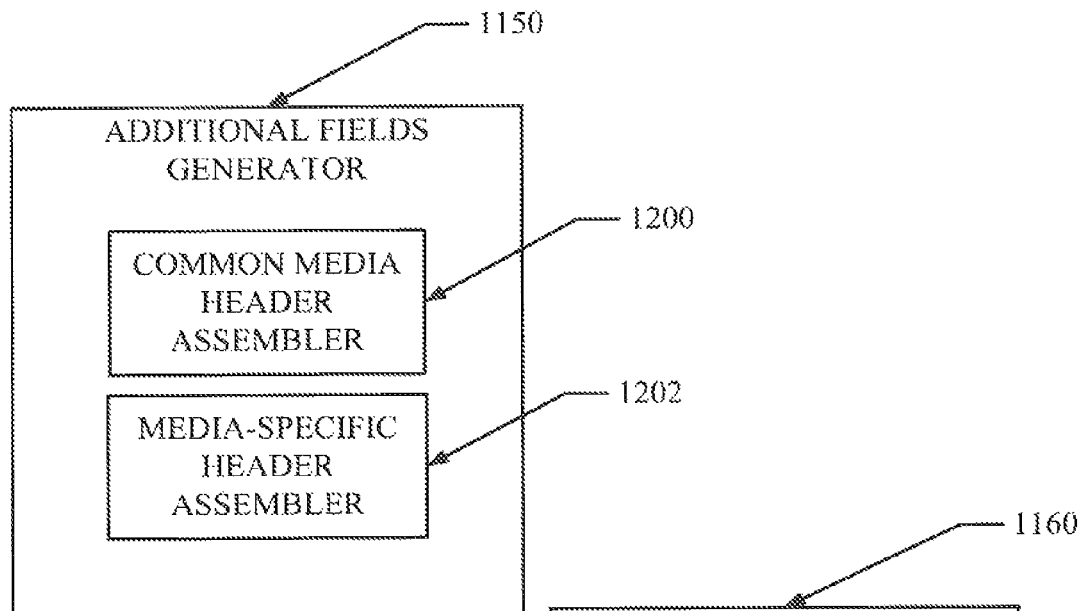
FIG. 12A illustrates an additional fields generator of the sync header generator.

The sync header 1100 consists of a media type field 1102 followed by additional fields 1104 whose format depends on the value of the media type field generated by the media field type generator 1130. The additional fields generator 1150 is shown in FIG. 12A.

The general format of the sync header 1100 is shown in Table 2. The Tables include a field name, a field type, and a field presence. The field presence would indicate whether the field is mandatory, conditional, etc. The field type indicates whether the field is a UINT, Variable, Bits, etc.

TABLE 2

General Format of sync layer Header

| Field Name | Field Type | Field Presence |
| --- | --- | --- |
| MEDIA_TYPE (1102) | UINT(2) | MANDATORY |
| Additional Fields (1104) | Variable | MANDATORY |

MEDIA_TYPE

The MEDIA_TYPE field 1102 identifies the type of media frame carried by the sync layer packet, or that the sync layer packet is carrying an adaptation frame. The defined values for MEDIA_TYPE are listed in Table 3:

TABLE 3

Defined values for MEDIA_TYPE

| Name | Value |
| --- | --- |
| VIDEO | 00 |
| AUDIO | 01 |
| TIMED_DATA | 10 |
| ADAPTATION | 11 |

Additional Fields

FIG. 12A illustrates an additional fields generator 1150 of the sync header generator 1110. The additional fields generator 1150 includes a common media header assembler 1200 and a media-specific header assembler 1202.

The format of the additional fields 1104 depends on the value of the media type field 1102. The common media header assembler 1200 assembles the CMH (FIG. 5A) in accordance with the details in Table 4. The media-specific header assembler 1202 assembles the MSH (FIG. 5A) in accordance with the details in Table 4. The general format of header fields for sync packets transporting video, audio or timed data media frames is shown in Table 4.

TABLE 4

| General Format of Additional Fields for sync layer Header for media frames | | |
|---|---|---|
| Field Name | Field Type | Field Presence |
| Common Media Header | BIT(22) | MANDATORY |
| Media-Specific Header | Variable | CONDITIONAL |

Figure 12B:
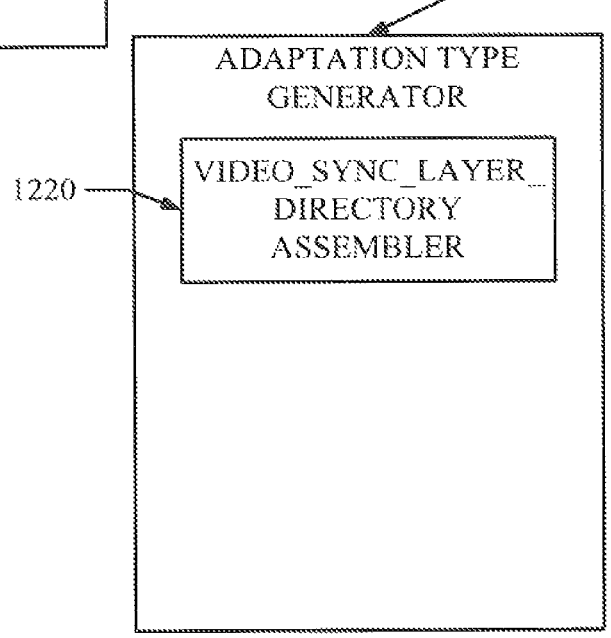
FIG. 12B illustrates an adaptation type generator of the sync header generator.

The general format of header fields for sync packets transporting adaptation frames is shown in Table 5. FIG. 12B illustrates an adaptation type generator 1160 of the sync header generator 1110.

TABLE 5

| General Format of Additional Fields for sync layer Header for adaptation frames | | |
|---|---|---|
| Field Name | Field Type | Field Presence |
| ADAPTATION_TYPE | UINT(6) | MANDATORY |

Common Media Header

Figure 13A:
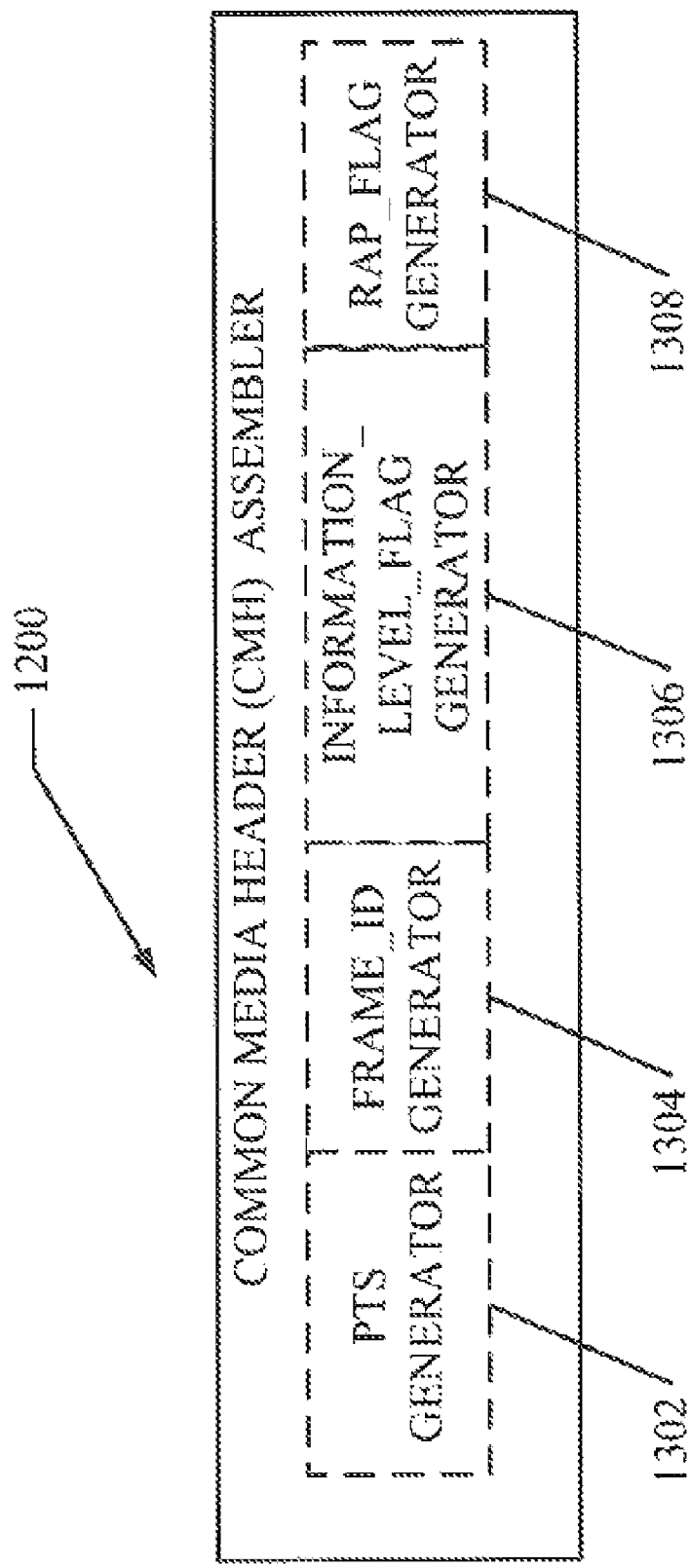
FIG. 13A illustrates a common media header assembler.

FIG. 13A illustrates a media common header assembler 1200. The CMH assembler 1200 includes a PTS generator 1302, a frame_id generator 1304, an information_level_flag_generator 1306 and a RAP_flag_generator 1308. The format of the common media header (CMH) for sync layer packets carrying media frames is shown in Table 6. The common media header (CMH) provides various information. The CMH information includes 1) time stamp and media frame ID information; 2) Random Access Points in the continuous stream of data. This supports rapid acquisition of Audio, Video and Timed Text streams. The CMH information also includes 3) non-reference frame indications. These allow media frames to be dropped without processing in certain circumstances (e.g. Fast Forward). The CMH information also includes 4) a quality level indicator.

The format of the Common Media Header generated by the common media header assembler 1200 is shown in Table 6.

TABLE 6

| Format of the Common Media Header | | |
|---|---|---|
| Field Name | Field Type | Field Presence |
| PTS | UINT(14) | MANDATORY |
| FRAME_ID | UINT(6) | MANDATORY |
| INFORMATION_LEVEL_FLAG | BIT(1) | MANDATORY |
| RAP_FLAG | BIT(1) | MANDATORY |

The individual fields of the CMH are defined below.
PTS

Figure 13B:
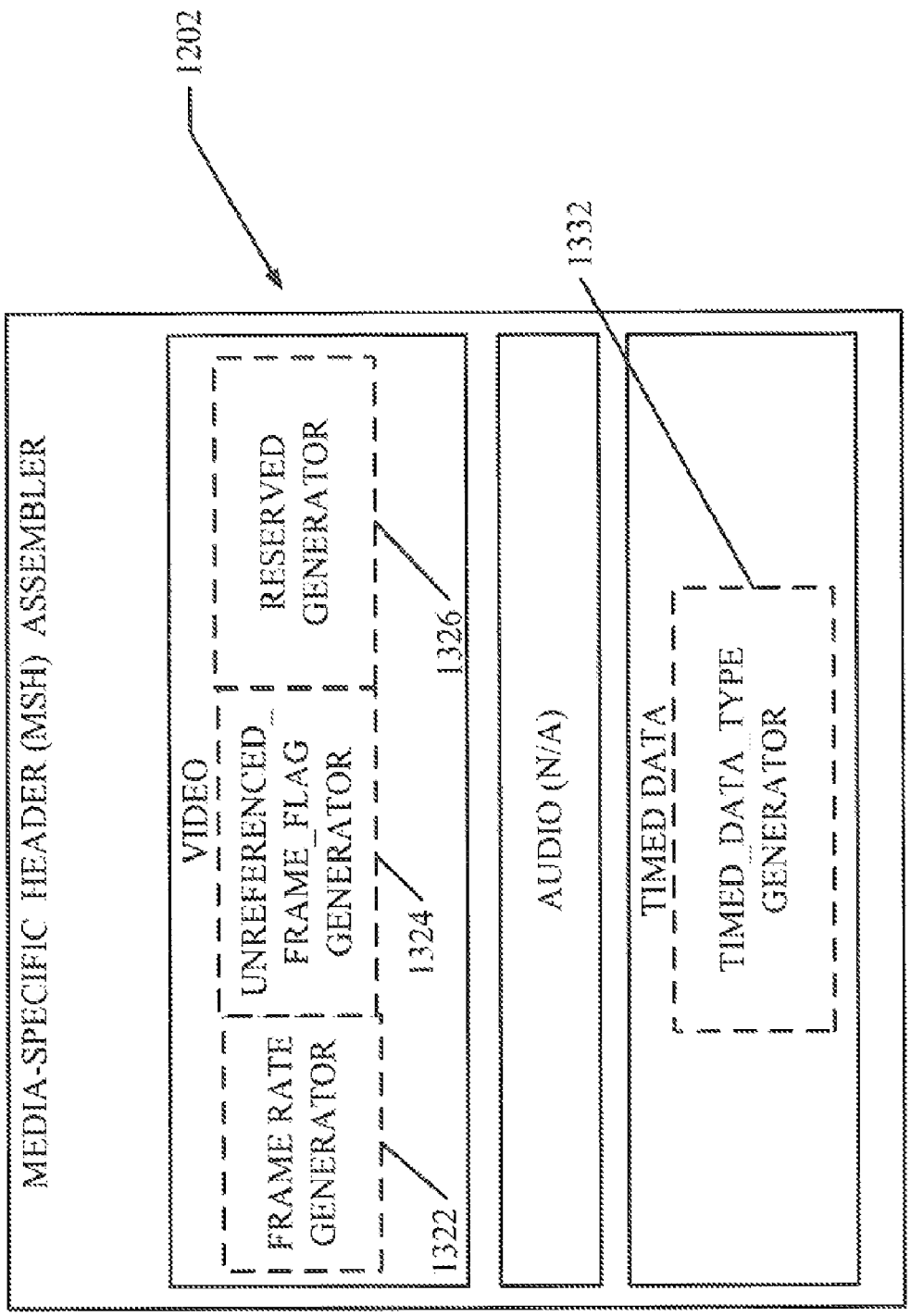
FIG. 13B illustrates a media-specific header assembler.

The PTS field is the Presentation Time Stamp of the media frame and is generated by the PTS generator 1302. This field is specified in units of milliseconds. The PTS field is added to the superframe Time to get the actual time at which the media frame is to be presented.
FRAME_ID The FRAME_ID is the number of the media frame within the superframe and is generated by the frame_id generator 1304. The number is set to 0 for the first media frame within the superframe and incremented for each subsequent media frame that has a different value for the PTS.
INFORMATION_LEVEL_FLAG The INFORMATION_LEVEL_FLAG is a bit that indicates whether the media frame conveys essential information for the media frame or additional information that may be combined with essential information. The INFORMATION_LEVEL_FLAG is generated by the information_level_flag generator 1306. The generator 1306 would generate the INFORMATION_LEVEL_FLAG according to the following conditions. If the media frame conveys essential information (condition 1), the INFORMATION_LEVEL_FLAG can be set to 0. If the media frame conveys additional quality (condition 2), the INFORMATION_LEVEL_FLAG can be set to 1. If the media codec does not support an additional information_level (condition 3), the INFORMATION_LEVEL_FLAG can be set to 0 and the field can be ignored by the device.
RAP_FLAG The RAP_FLAG signals whether the media frame is a random access point and are generated by the RAP_flag generator 1308. The device 304 may use the RAP_FLAG during reacquisition or channel switching to determine whether it can begin to access the media stream with this media frame. The RAP_flag generator 1308 will generate a RAP_FLAG according to various conditions. If (for condition 1) the MEDIA_TYPE is set to VIDEO or AUDIO, and if the media frame is a random access point, the RAP_FLAG can be set to 1. If (for condition 2) the MEDIA_TYPE is set to VIDEO or AUDIO, and if the media frame is not a random access point, the RAP_FLAG can be set to 0. If (for condition 3) the MEDIA_TYPE is set to TIMED_DATA, the RAP_FLAG can be set to 1 on all media frames.
Media-Specific Headers FIG. 13B illustrates a media-specific header assembler 1202. The media-specific header (MSH) assembler 1202 assembles the formats of the media-specific header (FIG. 5A) for sync layer packets carrying media frames, according to media type. The media types are audio, video, timed data and adaptation. The MSH assembler 1202 includes a frame rate generator 1322, an unreferenced_frame_flag generator 1324 and a reserved field generator 1326 for a media type designated for video.
Video The media-specific header (MSH) for sync layer packets carrying video media frames is the video media header. The format of the Video Media Header is specified in Table 7.

TABLE 7

| Video Media Header | | |
|---|---|---|
| Field Name | Field Type | Field Presence |
| FRAME_RATE | UINT(3) | MANDATORY |
| UNREFERENCED_FRAME_FLAG | BIT(1) | MANDATORY |
| RESERVED | UINT(4) | MANDATORY |

The individual fields of the Video Media Header are defined below.
FRAME_RATE

The FRAME_RATE field represents the rate at which video frames are generated by the network and is generated by the frame rate generator 1322 in accordance with the values in Table 8. The defined values for FRAME_RATE are shown in Table 8.

TABLE 8

Defined values for FRAME_RATE

| Frame Rate (frames per second) | Value |
| --- | --- |
| 24000/1001 (23.976) | 000 |
| 24 | 001 |
| 25 | 010 |
| 30000/1001 (29.97) | 011 |
| 30 | 100 |
| 50 | 101 |
| 60000/1001 (59.94) | 110 |
| 60 | 111 |

The FRAME_RATE rate is the nominal display rate in frames per second if the complete video stream is received. For example, if a video stream is sent using both the Base and Enhancement layers, the FRAME_RATE is the rate after both streams of data are completely decoded. Actual display rates may differ. For example, a device which receives only the Base layer of a transmission may display frames at a lower rate.

UNREFERENCED_FRAME_FLAG

The UNREFERENCED_FRAME_FLAG is a bit that indicates whether the media frame is used as a reference in the reconstruction of other media frames and is generated by the unreferenced_frame_flag generator 1324. The generator 1324 generates the UNREFERENCED_FRAME_FLAG based on the following conditions. If the media frame is a reference frame (condition 1), the UNREFERENCED_FRAME_FLAG can be set to 0. If the media frame is not a reference frame (condition 2), the UNREFERENCED_FRAME_FLAG can be set to 1.

Reserved

The value of all RESERVED bits can be set to 0 and is generated by the reserved field generator 1326 as necessary.

Audio

The media-specific header assembler 1202 does not generate a media-specific header for sync layer packets carrying audio media frames. Nonetheless, the media-specific header assembler 1202 may be modified to provide such a MSH for audio.

Timed Data

The media-specific header assembler 1202 includes a timed_data_type generator 1332. The media-specific header for sync layer packets carrying timed data media frames is the timed data media header. The format of the timed data media header generated by the timed_data_type generator 1332 is shown in Table 9.

TABLE 9

Format of the Timed Data Media Header

| Field Name | Field Type | Field Presence |
| --- | --- | --- |
| TIMED_DATA_TYPE | UINT(8) | MANDATORY |

TIMED_DATA_TYPE

The TIMED_DATA_TYPE field identifies the specific type of data in the TIMED_DATA media frame and is generated by the timed_data_type generator 1332. The defined values for TIMED_DATA_TYPE are given in Table 10.

TABLE 10

Defined Values for TIMED_DATA_TYPE

| Name | Value |
| --- | --- |
| CHARACTER_TEXT | 0 |

The values 1 through 256 are reserved.

ADAPTATION_TYPE

FIG. 12B illustrates the adaptation type generator 1160 of the sync header generator 1110. The adaptation type generator 1160 includes a video_sync_layer directory assembler 1220. The APPLICATION_TYPE field specifies the type of adaptation data in the adaptation frame. The defined values of the APPLICATION_TYPE field are specified in Table 11.

TABLE 11

Defined values for ADAPTATION_TYPE

| Name | Value |
| --- | --- |
| VIDEO_SYNC_LAYER_DIRECTORY | 1 |

All other values are reserved

Adaptation Frames

The structure of the body of the adaptation frame (e.g. 508) is dependent on the adaptation type. The body of the adaptation frame from each adaptation type is specified in Table 11 and described below.

Video Sync Layer (VSL) Directory

The video_sync_layer directory assembler 1220 generates a video sync layer directory which is an optional adaptation frame and may be used by the sync layer 406 in the device to assist the video codec in error recovery. For example, it may allow the sync layer 406 to determine whether a lost or corrupt frame was intended to be a reference frame. This knowledge may permit the video codec to determine whether subsequent frames up to the next reference frame should be processed or discarded.

Figure 14:
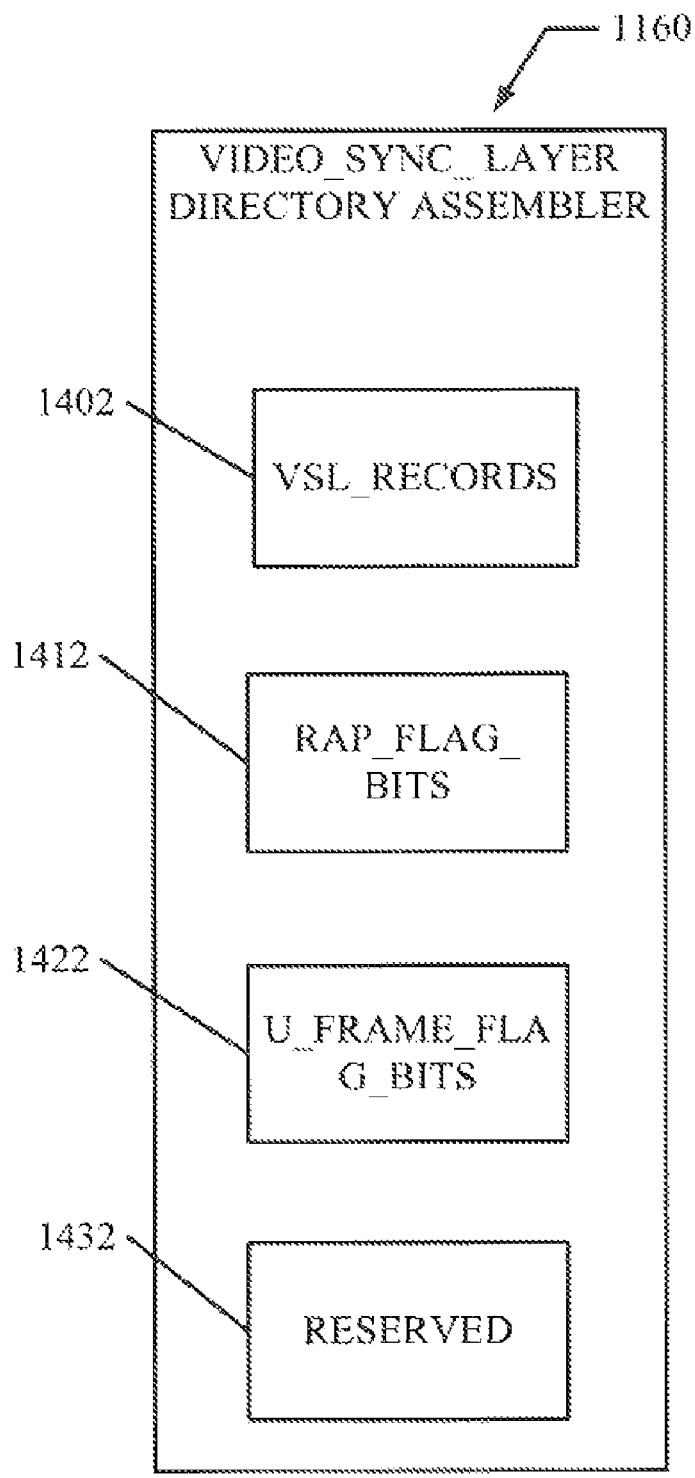
FIG. 14 illustrates a video sync layer directory assembler.

The video_sync_layer directory assembler 1160, illustrated in FIG. 14, includes a VSL_records module 1402, a RAP_flag bits module 1412, an U_frame_flag bits module 1422 and a reserved module 1432 to generate and assemble video_sync_layer directory. The video_sync_layer directory, if present, can be transported as a sync layer adaptation frame in the base layer component of the stream transporting the video flow to which it applies. It should be transmitted at least once per superframe. The format of the video_sync_layer directory is specified in Table 12.

TABLE 12

Video sync layer (VSL) Directory

| Field Name | Field Type | Field Presence |
| --- | --- | --- |
| VSL_RECORDs | VSL_RECORD_TYPE | MANDATORY |
| RAP_FLAG_BITS | BIT(60) | MANDATORY |
| U_FRAME_FLAG_BITS | BIT(60) | MANDATORY |
| RESERVED | BIT(variable) | CONDITIONAL |

VSL_RECORD

Figure 15:
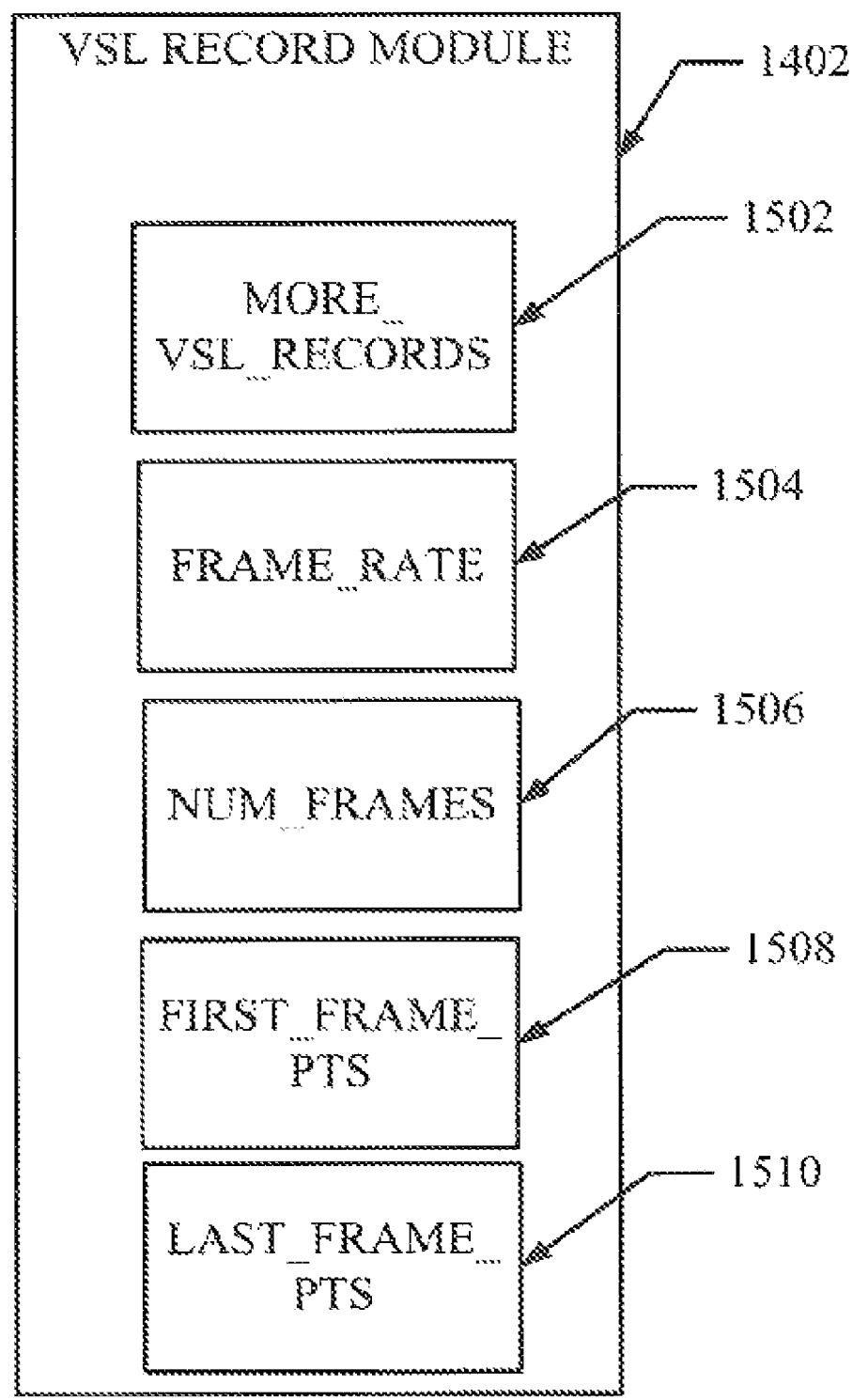
FIG. 15 illustrates a VSL Record assembler.

FIG. 15 illustrates a VSL record module 1402. The VSL record module 1402 includes a more_VSL_records module 1502, a frame_rate module 1504, a num_frames module 1506, a first frame_PTS module 1508 and a last_frame_PTS module 1510.

The more_VSL_records module 1502 may generate and assemble one or more VSL_RECORDs for the directory. The format of the VSL_RECORD is specified in Table 13.

TABLE 13

Format of a VSL_RECORD

| Field Name | Field Type | Field Presence |
|---|---|---|
| MORE_VSL_RECORDS | BIT(1) | MANDATORY |
| FRAME_RATE | UINT(3) | MANDATORY |
| NUM_FRAMES | UINT(6) | MANDATORY |
| FIRST_FRAME_PTS | UINT(14) | MANDATORY |
| LAST_FRAME_PTS | UINT(14) | MANDATORY |

MORE_VSL_RECORDS

The more_VSL_records module 1502 generates a MORE_VSL_RECORDS flag which can be set to 0 if the current VSL_RECORD is the last in the Video sync layer Directory.

The more_VSL_records module 1502 generates a MORE_VSL_RECORDS flag which can be set to 1 if the current VSL_RECORD is not the last in the Video sync layer Directory.

The number of VSL_RECORDs in a Video sync layer Directory can be 1 greater than the number of changes in nominal video frame rate in the superframe.

FRAME_RATE

The frame_rate module 1504 generates and assembles a FRAME_RATE field which provides frame rate information applicable to the VSL_RECORD. Table 8 specifies the defined values for the FRAME_RATE field.

NUM_FRAMES

The num_frames module 1506 generates a NUM_FRAMES field which indicates the number of video media frames with different frame ID values at the frame rate specified by the FRAME_RATE field in the block of consecutive video media frames starting at FIRST_FRAME_PTS within the superframe.

FIRST_FRAME_PTS

The first_frame_PTS module 1508 generates a FIRST_FRAME_PTS which is the PTS of the first video media frame of a block of consecutive video media frames with the frame rate specified by FRAME_RATE.

LAST_FRAME_PTS

The last_frame_PTS module 1510 generates an assembles a LAST_FRAME_PTS which is the PTS of the last video media frame of the block of consecutive video media frames with the frame rate specified by FRAME_RATE starting at FIRST_FRAME_PTS.

RAP_FLAG_BITS

The RAP_flag bits module 1412 generates the RAP_FLAG_BITS. The Video sync layer Directory contains 60 RAP_FLAG_BITS, corresponding to a maximum of 60 video media frames in a superframe. Each bit of the RAP_FLAG_BITS field corresponds to a particular video media frame, up to the number of distinct video media frames in the superframe, identified by frame ID. The least significant bit corresponds to the first video media frame covered by the first VSL_RECORD. The RAP_FLAG_BITS covered by the first VSL_RECORD are followed by the RAP_FLAG_BITS covered by the second and subsequent VSL_RECORDs, if present, in order of transmission.

Each bit in the RAP_FLAGS_BIT field bit of the Video sync layer Directory can be set to 1 if the corresponding video media frame is a random access point and is not an accompanied by a non-RAP frame with the same frame ID. Otherwise, the bit is set to 0. Bits following the bit in RAP_FLAG_BITS that corresponds to the last transmitted video media frame in the superframe can be set to 0.

U_FRAME_FLAG_BITS

The U_frame_flag bits module 1422 generates a message that contains 60 U_FRAME_FLAG_BITS, corresponding to a maximum of 60 video media frames in a superframe. Each bit of the U_FRAME_FLAG_BITS field corresponds to a particular video media frame, up to the number of distinct video media frames in the superframe, identified by frame ID. The least significant bit corresponds to the first video media frame covered by the first VSL_RECORD. The U_FRAME_FLAG_BITS covered by the first VSL_RECORD are followed by the U_FRAME_FLAG_BITS covered by the second and subsequent VSL_RECORDs, if present, in order of transmission.

Each bit in the U_FRAME_FLAG_BIT field of the Video sync layer Directory can be set to 1 if the corresponding video frame is a non-reference frame. Otherwise, the bit is set to 0. Bits following the bit in U_FRAME_FLAG_BITS that corresponds to the last transmitted frame in the superframe can be set to 0.

RESERVED

The U_FRAME_FLAG_BIT field is followed by the minimum number of RESERVED bits generated by the reserved module 1432 necessary to align the final byte of the video sync directory to a byte boundary. The network can set the RESERVED bits in the video sync directory to 0.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

In one or more exemplary configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

The invention claimed is:

1. A device comprising:
a processor operative to generate a channel switch frame (CSF) from one or more network abstraction layer (NAL) units to enable random access points in a coded bitstream, wherein at least one of the NAL units comprises an Instantaneous Decoding Refresh (IDR) NAL unit having a non-zero frame identification number equal to a frame number of a corresponding P-slice.

2. The device of claim 1, wherein the IDR NAL unit has a non-zero picture order count (POC) number.

3. The device of claim 1, wherein the processor is operative to generate the CSF with at least two additional NAL units, the at least two additional NAL units comprising a sequence parameter set (SPS) NAL unit and a picture parameter set (PPS) NAL unit.

4. The device of claim 1, wherein the CSF includes an I-frame NAL unit.

5. The device of claim 1, further comprising a transmitter to broadcast the CSF as a random access point (RAP) frame.

6. The device of claim 1, wherein the CSF is operative to cause switching from one channel to another channel or to facilitate error recovery.

7. An integrated circuit comprising:
a processor operative to generate a channel switch frame (CSF) from one or more network abstraction layer (NAL) units to enable random access points in a coded bitstream, wherein at least one of the NAL units comprises a low-quality Instantaneous Decoding Refresh (IDR) NAL unit having a non-zero frame identification number equal to a frame number of a corresponding P-slice.

8. The integrated circuit of claim 7, wherein the IDR NAL unit has a non-zero picture order count (POC) number.

9. The integrated circuit of claim 7, wherein the processor is operative to generate the CSF with at least two additional NAL units, the at least two additional NAL units comprising a sequence parameter set (SPS) NAL unit and a picture parameter set (PPS) NAL unit.

10. The integrated circuit of claim 7, wherein the CSF includes an I-frame NAL unit.

11. The integrated circuit of claim 7, further comprising a transmitter to broadcast the CSF as a random access point (RAP) frame.

12. The integrated circuit of claim 7, wherein the CSF is operative to cause switching from one channel to another channel or to facilitate error recovery.

13. A computer program product including a non-transitory computer readable medium having instructions for causing a computer to:
generate a channel switch frame (CSF) from one or more network abstraction layer (NAL) units to enable random access points in a coded bitstream to cause switching from one channel to another channel or to facilitate error recovery, wherein at least one of the NAL units comprises a low-quality Instantaneous Decoding Refresh (IDR) NAL unit having a non-zero frame identification number equal to a frame number of a corresponding P-slice.

14. The computer program product of claim 13, wherein the IDR NAL unit has a non-zero picture order count (POC) number.

15. The computer program product of claim 13, wherein the instructions to generate the CSF includes instructions to generate the CSF with at least two additional NAL units, the at least two additional NAL units comprising a sequence parameter set (SPS) NAL unit and a picture parameter set (PPS) NAL unit.

16. The computer program product of claim 13, wherein the instructions to generate the CSF includes instructions to generate an I-frame NAL unit.

17. A device comprising:
a processor operative to decode one or more back-to-back video media frames of a block of consecutive video media frames, each with a same frame identification (ID) number that identifies a relative decode order of the corresponding frame, with a first video media frame of the back-to-back video media frames being a random access point (RAP) frame and a second video media frame of the back-to-back video media frames being a non-RAP frame.

18. The device of claim 17, wherein the processor is operative to decode only one of the back-to-back frames.

19. The device of claim 17, wherein the processor is operative to decode the RAP frame and drop frames in output order before the RAP frame.

20. The device of claim 19, wherein the processor is operative to decode the RAP frame by decoding a channel switch frame comprising one or more network abstraction layer (NAL) units.

21. A computer program product including a non-transitory computer readable medium having instructions for causing a computer to:
   decode one or more of back-to-back video media frames of a block of consecutive video media frames, each with a same frame identification (ID) number that identifies a relative decode order of the corresponding frame, with a first video media frame of the back-to-back video media frames being a random access point (RAP) frame and a second video media frame of the back-to-back video media frames being a non-RAP frame.

22. The computer program product of claim 21, wherein the instructions to decode include instructions to decode only one of the back-to-back frames.

23. The computer program product of claim 21, wherein the instructions to decode include instructions to decode the RAP frame and drop frames in output order before the RAP frame.

24. The computer program product of claim 23, wherein the instructions to decode the RAP frame includes instruction to decode a channel switch frame comprising one or more network abstraction layer (NAL) units.

25. A method comprising:
   decoding one or more of back-to-back video media frames of a block of consecutive video media frames, each with a same frame identification (ID) number that identifies a relative decode order of the corresponding frame, with a first video media frame of the back-to-back video media frames being a random access point (RAP) frame and a second video media frame of the back-to-back video media frames being a non-RAP frame.

26. The method of claim 25, wherein the decoding step includes decoding only one of the back-to-back frames.

27. The method of claim 26, further comprising the step of providing both back-to-back frames to a decoder.

28. The method of claim 25, wherein the decoding step includes decoding the RAP frame; and dropping frames in output order before the RAP frame.

29. The method of claim 28, wherein the decoding of the RAP frame includes decoding a channel switch frame comprising one or more network abstraction layer (NAL) units.

30. A method comprising the step of:
   encoding one or more of back-to-back video media frames of a block of consecutive video media frames, each with the same frame identification (ID) number that identifies a relative decode order of the corresponding frame, with a first video media frame of the back-to-back video media frames being a random access point (RAP) frame and a second video media frame of the back-to-back video media frames being a non-RAP frame.

31. A system comprising:
   an encoder operative to encode one or more of back-to-back video media frames of a block of consecutive video media frames, each with a same frame identification (ID) number that identifies a relative decode order of the corresponding frame, with a first video media frame of the back-to-back frames being a random access point (RAP) frame and a second video media frame of the back-to-back video media frames being a non-RAP frame; and
   a decoder operative to decode one or more of the back-to-back video media frames to switch channels or to facilitate error recovery.

32. A system comprising:
   an encoder operative to generate and broadcast a channel switch frame (CSF) from one or more network abstraction layer (NAL) units to enable random access points in a coded bitstream, wherein at least one of the NAL units comprises an Instantaneous Decoding Refresh (IDR) NAL unit having a non-zero frame identification number equal to a frame number of a corresponding P-slice; and
   a decoder operative to decode the CSF to cause switching from one channel to another channel or to facilitate error recovery.

33. A method comprising:
   generating a channel switch frame (CSF) from one or more network abstraction layer (NAL) units to enable random access points in a coded bitstream, wherein at least one of the NAL units comprises an Instantaneous Decoding Refresh (IDR) NAL unit having a non-zero frame identification number equal to a frame number of a corresponding P-slice.

34. The method of claim 33, wherein the IDR NAL unit has a non-zero picture order count (POC) number.

35. The method of claim 33, wherein the generating step further includes generating the CSF with at least two additional NAL units, the at least two additional NAL units comprises a sequence parameter set (SPS) NAL unit and a picture parameter set (PPS) NAL unit.

36. The method of claim 33, wherein the generating step includes generating the CSF with an I-frame NAL unit.

37. The method of claim 33, further comprising the step of broadcasting the CSF as a random access point (RAP) frame to effectuate channel switching.

38. The method of claim 37, further comprising receiving the CSF; and switching from one channel to another channel in response to the received CSF.

39. The method of claim 37, further comprising receiving the CSF; and recovering from an error in the coded bitstream in response to the received CSF.

* * * * *